United States Patent
Morein et al.

(10) Patent No.: US 11,605,149 B2
(45) Date of Patent: Mar. 14, 2023

(54) GRAPHICS PROCESSING ARCHITECTURE EMPLOYING A UNIFIED SHADER

(71) Applicant: ATI Technologies ULC, Markham (CA)

(72) Inventors: Stephen L. Morein, San Jose, CA (US); Laurent Lefebvre, Mascouche (CA); Andrew E. Gruber, Arlington, MA (US); Andi Skende, Worcester, MA (US)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 17/708,500

(22) Filed: Mar. 30, 2022

(65) Prior Publication Data

US 2022/0222770 A1    Jul. 14, 2022

Related U.S. Application Data

(63) Continuation of application No. 17/230,129, filed on Apr. 14, 2021, now Pat. No. 11,328,382, which is a
(Continued)

(51) Int. Cl.
*G06T 1/20* (2006.01)
*G06T 15/80* (2011.01)
*G06T 15/00* (2011.01)

(52) U.S. Cl.
CPC .............. *G06T 1/20* (2013.01); *G06T 15/005* (2013.01); *G06T 15/80* (2013.01)

(58) Field of Classification Search
None
See application file for complete search history.

(56) References Cited

U.S. PATENT DOCUMENTS

| 4,985,848 B1 | 1/1991 | Pfeiffer et al. |
| 5,485,559 A | 1/1996 | Sakaibara et al. |
| (Continued) | | |

FOREIGN PATENT DOCUMENTS

| EP | 2296116 A2 | 3/2011 |
| EP | 2299408 A2 | 3/2011 |
| (Continued) | | |

OTHER PUBLICATIONS

International Search Report and Written Opinion for PCT/IB2004/003821, dated Mar. 22, 2005.
(Continued)

*Primary Examiner* — Frank S Chen
(74) *Attorney, Agent, or Firm* — Sterne, Kessler, Goldstein & Fox P.L.L.C.

(57) ABSTRACT

A graphics processing architecture in one example performs vertex manipulation operations and pixel manipulation operations by transmitting vertex data to a general purpose register block, and performing vertex operations on the vertex data by a processor unless the general purpose register block does not have enough available space therein to store incoming vertex data; and continues pixel calculation operations that are to be or are currently being performed by the processor based on instructions maintained in an instruction store until enough registers within the general purpose register block become available.

20 Claims, 5 Drawing Sheets

Related U.S. Application Data continuation of application No. 17/005,703, filed on Aug. 28, 2020, now Pat. No. 11,023,996, which is a continuation of application No. 16/601,260, filed on Oct. 14, 2019, now Pat. No. 10,796,400, which is a continuation of application No. 15/193,647, filed on Jun. 27, 2016, now Pat. No. 10,489,876, which is a continuation of application No. 14/614,967, filed on Feb. 5, 2015, now Pat. No. 9,582,846, which is a continuation of application No. 14/312,014, filed on Jun. 23, 2014, now abandoned, which is a continuation of application No. 13/109,738, filed on May 17, 2011, now Pat. No. 8,760,454, which is a continuation of application No. 12/791,597, filed on Jun. 1, 2010, now abandoned, which is a continuation of application No. 11/842,256, filed on Aug. 21, 2007, now abandoned, which is a continuation of application No. 11/117,863, filed on Apr. 29, 2005, now Pat. No. 7,327,369, which is a continuation of application No. 10/718,318, filed on Nov. 20, 2003, now Pat. No. 6,897,871.

(56) References Cited

U.S. PATENT DOCUMENTS

| | | |
|---|---|---|
| 5,500,939 B1 | 3/1996 | Kurihara |
| 5,550,962 A | 8/1996 | Nakamura et al. |
| 5,808,690 B1 | 9/1998 | Rich |
| 5,815,023 A | 9/1998 | Webber et al. |
| 5,818,469 A | 10/1998 | Lawless et al. |
| 5,905,502 A | 5/1999 | Deering |
| 5,968,167 B1 | 10/1999 | Whittaker et al. |
| 6,105,127 B1 | 8/2000 | Kimura et al. |
| 6,118,452 A | 9/2000 | Gannett |
| 6,288,730 B1 | 9/2001 | Duluk, Jr. et al. |
| 6,353,439 B1 | 3/2002 | Lindholm et al. |
| 6,384,824 B1 | 5/2002 | Morgan et al. |
| 6,417,858 B1 | 7/2002 | Bosch et al. |
| 6,559,842 B1 | 5/2003 | Deering et al. |
| 6,573,893 B1 | 6/2003 | Naqvi et al. |
| 6,650,327 B1 | 11/2003 | Airey et al. |
| 6,650,330 B2 | 11/2003 | Lindholm et al. |
| 6,665,765 B1 | 12/2003 | Tang |
| 6,697,074 B2 | 2/2004 | Parikh et al. |
| 6,704,018 B1 | 3/2004 | Mori et al. |
| 6,724,394 B1 | 4/2004 | Zatz et al. |
| 6,731,289 B1 | 5/2004 | Peercy et al. |
| 6,809,732 B2 | 10/2004 | Zatz et al. |
| 6,864,893 B2 | 3/2005 | Zatz |
| 6,897,871 B1 | 5/2005 | Morein et al. |
| 6,980,209 B1 | 12/2005 | Donham et al. |
| 7,015,909 B1 | 3/2006 | Morgan, III et al. |
| 7,015,913 B1 | 3/2006 | Lindholm et al. |
| 7,038,685 B1 | 5/2006 | Lindholm et al. |
| 7,151,543 B1 * | 12/2006 | Moreton ............ G06T 15/00 345/557 |
| 7,233,335 B2 | 6/2007 | Moreton et al. |
| 7,239,322 B2 | 7/2007 | Lefebvre et al. |
| 7,327,369 B2 | 2/2008 | Morein et al. |
| 7,363,472 B2 | 4/2008 | Stuttard et al. |
| 7,376,811 B2 | 5/2008 | Kizhepat |
| 7,646,817 B2 | 1/2010 | Shen et al. |
| 7,742,053 B2 | 6/2010 | Lefebvre et al. |
| 7,746,348 B2 | 6/2010 | Lefebvre et al. |
| 8,760,454 B2 | 6/2014 | Morein et al. |
| 9,582,846 B2 | 2/2017 | Morein et al. |
| 10,489,876 B2 | 11/2019 | Morein et al. |
| 2002/0003541 A1 | 1/2002 | Boyd et al. |
| 2002/0047841 A1 | 4/2002 | Moriwaki |
| 2002/0078313 A1 | 6/2002 | Lee |
| 2003/0030643 A1 | 2/2003 | Taylor et al. |
| 2003/0076320 A1 | 4/2003 | Collodi |
| 2003/0088826 A1 | 5/2003 | Kizhepat |
| 2003/0115063 A1 | 6/2003 | Okunoki |
| 2003/0164830 A1 | 9/2003 | Kent |
| 2004/0041814 A1 | 3/2004 | Wyatt et al. |
| 2004/0164987 A1 | 8/2004 | Aronson et al. |
| 2004/0227763 A1 | 11/2004 | Wichman et al. |
| 2005/0068325 A1 | 3/2005 | Lefebvre et al. |
| 2005/0110792 A1 | 5/2005 | Morein et al. |
| 2005/0120194 A1 | 6/2005 | Kissell |
| 2005/0200629 A1 | 9/2005 | Morein et al. |
| 2007/0222785 A1 | 9/2007 | Lefebvre et al. |
| 2007/0222786 A1 | 9/2007 | Lefebvre et al. |
| 2007/0222787 A1 | 9/2007 | Lefebvre et al. |
| 2007/0285427 A1 | 12/2007 | Morein et al. |
| 2010/0156915 A1 | 6/2010 | Lefebvre et al. |
| 2010/0231592 A1 | 9/2010 | Morein et al. |
| 2011/0216077 A1 | 9/2011 | Morein et al. |
| 2014/0300613 A1 | 10/2014 | Morein et al. |
| 2015/0154731 A1 | 6/2015 | Morein et al. |
| 2016/0307356 A1 | 10/2016 | Morein et al. |
| 2020/0043127 A1 | 2/2020 | Morein et al. |

FOREIGN PATENT DOCUMENTS

| | | |
|---|---|---|
| EP | 2309460 A1 | 4/2011 |
| WO | WO 00/62182 | 10/2000 |

OTHER PUBLICATIONS

Breternitz et al., "Compilation, Architectural Support, and Evalulation of SIMD Graphics Pipeline Programs on a General-Purpose CPU", 2003; pp. 1-11.

European Patent Office Examination Report for EP Application No. 04798938.9, dated Nov. 9, 2006; 3 pages.

Purcell et al., "Ray Tracing on Programmable Graphics Hardware," SIGGRAPH '02; San Antonio, TX; ACM Transactions on Graphics; Jul. 2002; pp. 703-712.

Mark et al., "Cg: A sysem for programming graphics hardware in a C-like language," SIGGRAPH, San Diego, CA; ACM Transactions on Graphics, Jul. 2003; pp. 896-907.

EP Supplemental Search Report for EP Application No. 10075688. 1, dated Feb. 25, 2011.

EP Supplemental Search Report for EP Application No. 10075686. 5, dated Feb. 25, 2011.

EP Supplemental Search Report for EP Application No. 10075687. 3, dated Feb. 25, 2011.

EP Supplemental Search Report for EP Application No. 10075685. 7, dated Feb. 25, 2011.

Eldridge et al., "Pomegranate: A Fully Scalabe Graphics Architecture," Proceedings SIGGRAPH/Eurographics Workshop on Graphics Hardware, Aug. 21, 2000.

Owens et al., "Polygon Rendering on a Stream Architecture," Proceedings SIGGRAPH/Eurographics Workshop on Graphics Hardware, Aug. 21, 2000.

Chinese Office Action; Chinese Application No. 2004800405708, dated Sep. 2008.

Chinese Office Action; Chinese Application No. 2004800405708, dated Nov. 2009.

Chinese Office Action; Chinese Application No. 2004800405708, dated Sep. 2010.

Petition for *Inter Partes* Review of U.S. Pat. No. 7,742,053, *LG Electronics* v. *ATI Technologies ULC*, Case No. IPR2015-00325, filed Dec. 10, 2014; 67 pages.

Patent Owner's Preliminary Response, *LG Electronics* v. *ATI Technologies ULC*, Case No. IPR2015-00325, filed Apr. 13, 2015; 70 pages.

Institution Decision, *LG Electronics* v. *ATI Technologies ULC*, Case No. IPR2015-00325, issued Jun. 15, 2015; 38 pages.

Patent Owner's Response, *LG Electronics* v. *ATI Technologies ULC*, Case No. IPR2015-00325, filed Sep. 9, 2015; 73 pages.

Petitioner's Reply, *LG Electronics* v. *ATI Technologies ULC*, Case No. IPR2015-00325, filed Dec. 3, 2015; 33 pages.

Final Written Decision, *LG Electronics* v. *ATI Technologies ULC*, Case No. IPR2015-00325, issued Apr. 14, 2016; 105 pages.

(56) References Cited

OTHER PUBLICATIONS

Petition for *Inter Partes* Review of U.S. Pat. No. 6,897,871, *LG Electronics v. ATI Technologies ULC*, Case No. IPR2015-00326, filed Dec. 10, 2014; 67 pages.
Patent Owner's Preliminary Response, *LG Electronics v. ATI Technologies ULC*, Case No. IPR2015-00326, filed Apr. 13, 2015; 37 pages.
Institution Decision, *LG Electronics v. ATI Technologies ULC*, Case No. IPR2015-00326, issued Jul. 10, 2015; 28 pages.
Patent Owner's Response, *LG Electronics v. ATI Technologies ULC*, Case No. IPR2015-00326, filed Oct. 15, 2015; 62 pages.
Petitioner's Reply, *LG Electronics v. ATI Technologies ULC*, Case No. IPR2015-00326, filed Jan. 11, 2016; 32 pages.
Final Written Decision, *LG Electronics v. ATI Technologies ULC*, Case No. IPR2015-00326, issued Jun. 28, 2016; 20 pages.
Petition for *Inter Partes* Review of U.S. Pat. No. 7,327,369, *LG Electronics v. ATI Technologies ULC*, Case No. IPR2015-00330, filed Dec. 10, 2014; 65 pages.
Patent Owner's Preliminary Response, *LG Electronics v. ATI Technologies ULC*, Case No. IPR2015-00330, filed Apr. 13, 2015; 36 pages.
Institution Decision, *LG Electronics v. ATI Technologies ULC*, Case No. IPR2015-00330, issued Jul. 10, 2015; 20 pages.
Patent Owner's Response, *LG Electronics v. ATI Technologies ULC*, Case No. IPR2015-00330, filed Oct. 15, 2015; 41 pages.
Petitioner's Reply, *LG Electronics v. ATI Technologies ULC*, Case No. IPR2015-00330, filed Jan. 11, 2016; 23 pages.
Final Written Decision, *LG Electronics v. ATI Technologies ULC*, Case No. IPR2015-00330, issued Jul. 1, 2016; 13 pages.
Prosecution History of U.S. Pat. No. 7,742,053, U.S. Appl. No. 11/746,453, filed Sep. 29, 2003; 136 pages.
Declaration of Dr. Nader Bagherzadeh, *LG Electronics v. ATI Technologies ULC*, Case No. IPR2015-00325, Dec. 10, 2014; 87 pages.
Proposed Patent Owner's Revised Redacted Response, *LG Electronics v. ATI Technologies ULC*, Case No. IPR2015-00325, Oct. 9, 2015; 73 pages.
Declaration of Raymond Vargas, *LG Electronics v. ATI Technologies ULC*, Case No. IPR2015-00325, filed Dec. 3, 2015; 24 pages.
Deposition Transcript of Calvin Watson, *LG Electronics v. ATI Technologies ULC*, Case Nos. IPR2015-00325, -00326, and -00330, Nov. 4, 2015; 84 pages.
Deposition Transcript of Dr. Andrew Wolfe, Day One, *LG Electronics v. ATI Technologies ULC*, Case Nos. IPR2015-00325, -00326, and -00330, Nov. 9, 2015; 280 pages.
Deposition Transcript of Dr. Andrew Wolfe, Day Two, *LG Electronics v. ATI Technologies ULC*, Case Nos. IPR2015-00325, -00326, and -00330, Nov. 10, 2015; 59 pages.
Deposition Transcript of Laurent Lefebvre, *LG Electronics v. ATI Technologies ULC*, Case Nos. IPR2015-00325, -00326, and -00330, Nov. 13, 2015; 159 pages.
Independent Claims of U.S. Pat. No. 7,742,053, filed May 9, 2007; 1 page.
*L-3 Commc'ns Corp. v. Sony Corp.*, Case No. 10-cv-734-RGA, 2013 U.S. Dist. LEXIS 148680 (D. Del. Oct. 16, 2013); 2 pages.
*Suncast Corp. v. Avon Plastics*, Case No. 97-cv-178, 1999 U.S. Dist. LEXIS 15222 (N.D. Ill. Sep. 21, 1999); 21 pages.
Transcript of Teleconference, *LG Electronics v. ATI Technologies ULC*, Case No. IPR2015-00325, Jan. 21, 2016; 9 pages.
Petitioner's Hearing Demonstratives, *LG Electronics v. ATI Technologies ULC*, Case No. IPR2015-00325, filed Feb. 9, 2016; 20 pages.
Woo et al., OpenGL Programming Guide: The Official Guide to Learning OpenGL, Version 1.1 (OTL), 1997; pp. 1-26, 37-48, 154-168, 180-195, 296-308.
Foley et al., Computer Graphics: Principles and Practice, 1997; pp. 201-210, FIG. 16.5, 721-728.
Declaration of Laurent Lefebvre, *LG Electronics v. ATI Technologies ULC*, Case No. IPR2015-00325, filed Sep. 9, 2015; 61 pages.
R400 Sequencer Specification (Version 0.1), May 7, 2001; 9 pages.
R400 Sequencer Specification (Version 0.3), May 7, 2001; 16 pages.
R400 Sequencer Specification (Version 0.4), Aug. 14, 2001; 20 pages.
R400 Sequencer Specification (Version 0.5), Aug. 14, 2001; 26 pages.
R400 Sequencer Specification (Version 0.6), Sep. 24, 2001; 31 pages.
R400 Sequencer Specification (Version 0.7), Sep. 24, 2001; 33 pages.
R400 Sequencer Specification (Version 0.8), Sep. 24, 2001; 26 pages.
R400 Sequencer Specification (Version 0.9), Sep. 24, 2001; 27 pages.
R400 Sequencer Specification (Version 1.0), Sep. 24, 2001; 28 pages.
R400 Sequencer Specification (Version 1.1), Sep. 24, 2001; 32 pages.
R400 Sequencer Specification (Version 1.2), Sep. 24, 2001; 35 pages.
R400 Sequencer Specification (Version 1.4), Sep. 24, 2001; 43 pages.
R400 Sequencer Specification (Version 1.5), Sep. 24, 2001; 48 pages.
R400 Sequencer Specification (Version 1.6), Sep. 24, 2001; 47 pages.
R400 Sequencer Specification (Version 1.7), Sep. 24, 2001; 50 pages.
R400 Sequencer Specification (Version 1.8), Sep. 24, 2001; 48 pages.
R400 Sequencer Specification (Version 1.9), Sep. 24, 2001; 50 pages.
R400 Sequencer Specification (Version 1.10), Sep. 24, 2001; 52 pages.
R400 Sequencer Specification (Version 1.11), Sep. 24, 2001; 52 pages.
R400 Sequencer Specification (Version 2.0), Sep. 24, 2001; 58 pages.
R400 Sequencer Specification (Version 2.1), Sep. 24, 2001; 54 pages.
R400 Sequencer Specification (Version 2.2), Sep. 24, 2001; 53 pages.
R400 Sequencer Specification (Version 2.3), Sep. 24, 2001; 54 pages.
R400 Sequencer Specification (Version 2.4), Sep. 24, 2001; 51 pages.
R400 Sequencer Specification (Version 2.5), Sep. 24, 2001; 53 pages.
R400 Sequencer Specification (Version 2.6), Sep. 24, 2001; 51 pages.
R400 Sequencer Specification (Version 2.7), Sep. 24, 2001; 51 pages.
R400 Sequencer Specification (Version 2.8), Sep. 24, 2001; 51 pages.
R400 Sequencer Specification (Version 2.9), Sep. 24, 2001; 54 pages.
R400 Sequencer Specification (Version 2.10), Sep. 24, 2001; 56 pages.
R400 Sequencer Specification (Version 2.11), Jul. 9, 2003; 54 pages.
R400 Architecture Proposal (Version 0.1), Nov. 13, 2000; 16 pages.
R400 Top Level Specification (Version 0.2), Mar. 11, 2001; 32 pages.
R400 Shader Processor (Version 0.1), Jan. 23, 2001; 12 pages.
R400 Sequencer Specification Log (Versions 0.1 to 1.2), May 25, 2001 through Nov. 16, 2011; 1 page.
R400 Sequencer Specification Log (Versions 1.4 to 2.11), Nov. 26, 2001 through Aug. 29, 2003; 2 pages.
R400 Architecture Proposal Log, Nov. 15, 2000 through Jul. 5, 2001; 1 page.
R400 Top Level Specification Log, Mar. 15, 2000 through Jul. 5, 2001; 1 page.
R400 Shader Processor Log, May 9, 2001 through Nov. 27, 2001; 1 page.

(56) References Cited

OTHER PUBLICATIONS

R400 Sequencer Emulator Folder History, Dec. 12, 2001 through Jun. 24, 2004; 19 pages.
R400 Sequencer Parts Folder History, Dec. 3, 2001 through Jun. 15, 2004; 34 pages.
R400 Document Library Folder History, Nov. 1, 2000 through Apr. 8, 2005; 111 page.
R400 Architecture Folder History, Nov. 15, 2000 through Dec. 12, 2003; 27 pages.
R400 GFX Sequencer Testing Folder History, Jul. 24, 2001 through Oct. 6, 2005; 128 pages.
Pellerite, P., ATI Technologies R400 Program, Program Review Slides, Dec. 13, 2001; 6 pages.
Gruber, A., ATI Technologies R400 Program, Architecture Slides, Dec. 13, 2001; 9 pages.
Cox, J., ATI Technologies R400 Program Review Slides, Dec. 13, 2001; 16 pages.
Fowler, M., ATI Technologies R400 Program, Marlboro Design Slides, Dec. 13, 2001; 21 pages.
Pellerite, P., ATI Technologies R400 Program, R400 Executive Review Slides, Jan. 17, 2002; 17 pages.
Fowler, M., ATI Technologies R400 Program Review Slides, Mar. 22, 2002; 6 pages.
Cox, J., ATI Technologies R400 Program, Program Review Slides, Mar. 22, 2002; 8 pages.
Pellerite, P., ATI Technologies R400 Program, March Review Slides, Mar. 22, 2002; 5 pages.
Fowler, M., ATI Technologies R400 Program, GC Design Status Slides, May 30, 2002; 12 pages.
Pellerite, P., ATI Technologies R400 Program, May Review Slides, May 30, 2002; 5 pages.
Cox, et al., ATI Technologies R400 Program Review Slides, Aug. 30, 2002; 16 pages.
Correll, K., ATI Technologies R400 Program, Hardware Design Slides, Aug. 30, 2002; 5 pages.
Fowler, M., ATI Technologies R400 Program, Emulator Status Slides, Aug. 30, 2002; 5 pages.
Pellerite, P., ATI Technologies R400 Program, Program Review Slides, Aug. 30, 2002; 6 pages.
Correll, K., ATI Technologies R400 Program, Marlboro Hardware Design Block Status Slides, Oct. 10, 2002; 5 pages.
Fowler, M., ATI Technologies R400 Program, Emulator Status Slides, Oct. 10, 2002; 4 pages.
Pellerite, P., ATI Technologies R400 Program Review Slides, Oct. 10, 2002; 11 pages.
Correll, K., ATI Technologies R400 Program, Marlboro Hardware Design Status Slides, Nov. 12, 2002; 3 pages.
Pellerite, P., ATI Technologies R400 Program Review Slides, Nov. 12, 2002; 7 pages.
RTL Code File: sq.v, ATI Technologies, Inc., 2001; 24 pages.
RTL Code File: sq_thread_buff.v, ATI Technologies, Inc., 2001; 14 pages.
RTL Code File: sq_thread_arb.v, ATI Technologies, Inc., 2001; 8 pages.
RTL Code File: sq_ctl_flow_seq.v, ATI Technologies, Inc., 2001; 13 pages.
RTL Code File: sq_instruction_store.v, ATI Technologies, Inc., 2001; 4 pages.
RTL Code File: sq_target_instr_fetch.v, ATI Technologies, Inc., 2001; 5 pages.
RTL Code File: sq_tex_instr_queue.v, ATI Technologies, Inc., 2001; 3 pages.
RTL Code File: sq_tex_instr_seq.v, ATI Technologies, Inc., 2001; 6 pages.
RTL Code File: sq_ais_output.v, ATI Technologies, Inc., 2001; 9 pages.
RTL Code File: sq_alu_instr_queue.v, ATI Technologies, Inc., 2001; 3 pages.
RTL Code File: sq_alu_instr_seq.v, ATI Technologies, Inc., 2001; 5 pages.
RTL Code File: sp.v, ATI Technologies, Inc., Nov. 16, 2001; 5 pages.
RTL Code File: vector.v, ATI Technologies, Inc., Jan. 30, 2002; 6 pages.
RTL Code File: macc_gpr.v, ATI Technologies, Inc., Feb. 1, 2002; 5 pages.
RTL Code File: macc.v, ATI Technologies, Inc., Oct. 8, 2001; 8 pages.
RTL Code File: tp.v, ATI Technologies, Inc., Aug. 5, 2002; 14 pages.
Emulator Code File: sq_block_model.cpp, ATI Technologies, Inc., 2002; 13 pages.
Emulator Code File: user_block_model.h, ATI Technologies, Inc., 2002; 3 pages.
Emulator Code File: arbiter.cpp, ATI Technologies, Inc., 2002; 17 pages.
Emulator Code File: arbiter.h, ATI Technologies, Inc., 2002; 2 pages.
Emulator Code File: sq_alu.cpp, ATI Technologies, Inc., 2001; 17 pages.
Emulator Code File: sq_alu.h, ATI Technologies, Inc., 2001; 1 page.
Emulator Code File: gpr_manager.cpp, ATI Technologies, Inc., 2002; 3 pages.
Emulator Code File: gpr_manager.h, ATI Technologies, Inc., 2002; 1 page.
Emulator Code File: instruction_store.cpp, ATI Technologies, Inc., 2002; 2 pages.
Emulator Code File: instruction_store.h, ATI Technologies, Inc., 2002; 1 page.
Emulator Code File: reg_file.cpp, ATI Technologies, Inc., 2002; 1 page.
Emulator Code File: reg_file.h, ATI Technologies, Inc., 2002; 1 page.
Emulator Code File: tp.cpp, ATI Technologies, Inc., 2001; 19 pages.
Emulator Code File: tp.h, ATI Technologies, Inc., 2001; 4 pages.
Emulator Code File: sq_tp.h, ATI Technologies, Inc., 2001; 2 pages.
Emulator Code File: tp_block_model.cpp, ATI Technologies, Inc.; 2 pages.
Emulator Code File: user_block_model.h, ATI Technologies, Inc., 2002; 1 page.
Declaration of Calvin Watson, *LG Electronics v. ATI Technologies ULC*, Case No. IPR2015-00325, Sep. 9, 2015; 76 pages.
Declaration of Dr. Andrew Wolfe in Support of Reduction to Practice, *LG Electronics v. ATI Technologies ULC*, Case No. IPR2015-00325, Sep. 9, 2015; 181 pages.
R400 Shader Pipe Parts Folder History, Aug. 8, 2002 through Dec. 3, 2001; 1 page.
RTL Code File: tp_input.v, ATI Technologies, 2001; 5 pages.
*Uniram Technology, Inc. v. Taiwan Semiconductor Manufacturing Co., Ltd., et al.*, 3:04-cv-01268-VRW, Findings of Facts and Conclusions of Law, Dkt. No. 627, Apr. 14, 2008; 28 pages.
Singh, et al., "MorphoSys: An Integrated Re-configurable Architecture," RTO SCI Symposium on 'The Application of Information Technologies (Computer Science) to Mission Systems', Apr. 20-22, 1998; 11 pages.
Davila, et al., "Design and Implementation of a Rendering Algorithm in a SIMD Reconfigurable Architecture (MorphoSys)," Proceedings of the conference on Design, automation and test in Europe: Designers' forum, 2006; pp. 52-57.
Luna, Introduction to 3D Game Programming with DirectX 9.0, 2003; Figures 4.2, 5.7, pp. 94-97, 107-109.
Ahmed et al., "OpenGL—Lighting, Material, Shading and Texture Mapping," IIT Bombay, Aug. 28, 2009; 7 pages.
Excerpts from Microsoft Computer Dictionary, 5th Ed., 2002; pp. 33, 111, 276, 406, 411, 419, 423-424, 449, 578.
Excerpts from Foley et al., Fundamentals of Interactive Computer Graphics, Reading, MA: Addison-Wesley, 1984; pp. 580-582.
"S3 Graphics: DirectX 10 Architecture for Chrome 400 Series Discrete Graphics Processors," S3 Graphics White Paper, Jul. 21, 2007; 19 pages.
Excerpts from Yoo et al., Mobile 3D Graphics SoC: From Algorithm to Chip, Singapore: John Wiley & Sons, 2010; pp. 113-115.
Excerpts from IEEE 100: The Authoritative Dictionary of IEEE Standards Terms, 7th ed., New York: IEEE, 2000; pp. 47-48.

(56) References Cited

OTHER PUBLICATIONS

Excerpts from Dictionary of Computing, 4th ed., London: Peter Collin Publishing, 2002; p. 374.
Deposition Transcript of Nader Bagherzadeh, Ph.D., *LG Electronics v. ATI Technologies ULC*, Case No. IPR2015-00325, Aug. 14, 2015; 58 pages.
Woo, et al., "A 195/152-mW mobile multimedia SoC with fully programmable 3D graphics and MPEG4/H.264/JPEG," IEEE J. Solid-St. Circ., vol. 43, Issue 9, 2008; pp. 2047-2056.
Technical Brief, NVIDIA GeForce® GTX 200 GPU Architectural Overview, May 2008; 23 pages.
Intel® Processor Graphics DirectX Developer's Guide, Intel Corporation, 2008-2010; 38 pages.
"The Rise of Mobile Gaming on Android: Qualcomm® Snapdragon™ Technology Leadership," Qualcomm Technologies, Inc., 2014; 22 pages.
Declaration of Dr. Andrew Wolfe in Support of the Patent Owner Response, *LG Electronics v. ATI Technologies ULC*, Case No. IPR2015-00325, Sep. 9, 2015; 108 pages.
Excerpts from Ball, Embedded Microprocessor Systems: Real World Design, 3rd ed., New York: Elsevier Science, 2002; p. 278.
Deposition Transcript of Raymond Vargas, *LG Electronics v. ATI Technologies ULC*, Case No. IPR2015-00325, Dec. 16, 2015; 134 pages.
Teleconference Transcript, *LG Electronics v. ATI Technologies ULC*, Case No. IPR2015-00325, Dec. 14, 2015; 23 pages.
Patent Owner Revised Demonstrative Exhibits, *LG Electronics v. ATI Technologies ULC*, Case Nos. IPR2015-00325, -00326, and -00330, Feb. 10, 2016; 71 pages.
Definition of "thread", Microsoft Computer Dictionary, 5th Edition, Redmond, WA: Microsoft, 2002; p. 518.
E-mail Exchange between Patent Trial and Appeal Board and Counsel, *LG Electronics v. ATI Technologies ULC*, Case No. IPR2015-00325, Feb. 5 through Feb. 9, 2016; 4 pages.
Prosecution History of U.S. Pat. No. 6,897,871, U.S. Appl. No. 10/718,318, filed Nov. 20, 2003; 55 pages.
Declaration of Nader Bagherzadeh, *LG Electronics v. ATI Technologies ULC*, Case No. IPR2015-00326, Dec. 10, 2014; 112 pages.
Petitioner's Hearing Demonstratives, *LG Electronics v. ATI Technologies ULC*, Case No. IPR2015-00326, filed Apr. 6, 2016; 17 pages.
Prosecution History of U.S. Pat. No. 7,327,369, U.S. Appl. No. 11/117,863, filed Apr. 29, 2005; 116 pages.
Declaration of Nader Bagherzadeh, *LG Electronics v. ATI Technologies ULC*, Case No. IPR2015-00330, Dec. 10, 2014; 86 pages.
Segal, et al., "The OpenGL Graphics System: A Specification (Version 1.4)," Silicon Graphics 1992-2002; 312 pages.
OpenGL Overview, accessed Nov. 23, 2014, https://www.opengl.org/about/#1; 1 page.
Declaration of Raymond Vargas, *LG Electronics v. ATI Technologies ULC*, Case No. IPR2015-00330, Jan. 11, 2016; 26 pages.
Declaration of Calvin Watson, *LG Electronics v. ATI Technologies ULC*, Case No. IPR2015-00326, Oct. 15, 2015; 76 pages.
Declaration of Calvin Watson, *LG Electronics v. ATI Technologies ULC*, Case No. IPR2015-00330, Oct. 15, 2015; 76 pages.
Declaration of Andrew Wolfe, *LG Electronics v. ATI Technologies ULC*, Case No. IPR2015-00326, Oct. 14, 2015; 271 pages.
Declaration of Andrew Wolfe, *LG Electronics v. ATI Technologies ULC*, Case No. IPR2015-00330, Oct. 14, 2015; 139 pages.
Declaration of Laurent Lefebvre, *LG Electronics v. ATI Technologies ULC*, Case No. IPR2015-00326, filed Oct. 9, 2015; 66 pages.
Declaration of Laurent Lefebvre, *LG Electronics v. ATI Technologies ULC*, Case No. IPR2015-00330, filed Oct. 9, 2015; 66 pages.
GPU Programming Guide GeForce 8 and 9 Series, NVIDIA, Dec. 19, 2008; 65 pages.
Excerpt from the Oxford Dictionary of Usage and Style, 2000; p. 27.
Gruber et al., "R400 Shader Processor 1.2," ATI Technologies 2001, Oct. 9, 2015; 43 pages.

Deposition Transcript of Nader Bagherzadeh, *LG Electronics v. ATI Technologies ULC*, Case Nos. IPR2015-00326 and IPR2015-00330, Sep. 15, 2015; 53 pages.
U.S. Appl. No. 10/718,318, filed Nov. 20, 2003; 24 pages.
Singer, "History of the Modern Graphics Processor, Part 3," Apr. 10, 2013; 15 pages.
Luebke et al., "How GPUs Work," IEEE Computer 96-100, 2007; 5 pages.
Microsoft and ATI Technologies Announce Technology Development Agreement, Microsoft, Aug. 13, 2003; 4 pages.
Shilov, "ATI and NVIDIA Proclaim Different Graphics Processors Architecture Goals: ATI Says Unified Rendering Engine—The Way To Go, NVIDIA Disagrees," Dec. 23, 2004; 3 pages.
Shilov, "NVIDIA Chief Architect: Unified Pixel and Vertex Pipelines—The Way to Go. NVIDIA Says it Would Make a Chip with Unified Pipes 'When it Makes Sense'," Xbit, Jul. 11, 2005; 2 pages.
RTL Code File: sq_input_arb.v, ATI Technologies, Inc., 2001; 3 pages.
RTL Code File: sq_defs.v, ATI Technologies, Inc.; 1 page.
RTL Code File: sq_export_alloc.v, ATI Technologies, Inc., 2001; 5 pages.
RTL Code File: export_control.v, ATI Technologies, Inc., Apr. 4, 2002; 25 pages.
RTL Code File: macc32.mc, ATI Technologies, Inc., Jan. 28, 2002; 2 pages.
RTL Code File: sx.v, ATI Technologies, Inc., Mar. 21, 2002; 7 pages.
RTL Code File: parameter_caches.v, Mar. 26, 2002; 5 pages.
RTL Code File: param_cache_ctl.v, ATI Technologies, Inc., Mar. 26, 2002; 4 pages.
RTL Code File: export_buffers.v, ATI Technologies, Inc., Apr. 16, 2002; 21 pages.
RTL Code File: pa.v, ATI Technologies, Inc., Mar. 17, 2002; 16 pages.
RTL Code File: pa_ag.v, ATI Technologies, Inc., 2001; 31 pages.
RTL Code File: pa_sxifccg.v, ATI Technologies, Inc., 2002; 8 pages.
RTL Code File: pa_ccg_sxifsm.v, ATI Technologies, Inc., 2002; 12 pages.
RTL Code File: sc.v, ATI Technologies, Inc., Mar. 17, 2002; 22 pages.
Takahashi, "The Xbox 360 Uncloaked: The Real Story Behind Microsoft's Next-Generation Video Game Console," SpiderWorks 2006; 9 pages.
Microsoft Corporation's Annual Report, 2006; 73 pages.
Deposition Transcript of Raymond Vargas, *LG Electronics v. ATI Technologies ULC*, Case Nos. IPR2015-00326 and IPR2015-00330, Feb. 5, 2016; 71 pages.
Patent Owner's Sur-Reply to Petitioner's Reply, Case No. IPR2015-00325, filed Dec. 23, 2015; 14 pages.
Transcript of Teleconference, *LG Electronics v. ATI Technologies ULC*, Case Nos. IPR2015-00326 and IPR2015-00330, Feb. 3, 2016; 25 pages.
Patent Owner's Demonstratives, *LG Electronics v. ATI Technologies ULC*, Case No. IPR2015-00326, Apr. 4, 2016; 49 pages.
Curriculum Vitae of Nader Bagherzadeh, Ph.D., *LG Electronics v. ATI Technologies ULC*, Case No. IPR2015-00325, Dec. 10, 2014; 33 pages.
Declaration of Mr. Jamie B. Beaber in Support of Motions for Pro Hac Vice Admission, *LG Electronics v. ATI Technologies ULC*, Case No. IPR2015-00325, Feb. 5, 2015; 4 pages.
Declaration of Mr. Michael Maas in Support of Motions for Pro Hac Vice Admission, *LG Electronics v. ATI Technologies ULC*, Case No. IPR2015-00325, Feb. 5, 2015; 3 pages.
Declaration of Raymond Vargas, *LG Electronics v. ATI Technologies ULC*, Case No. IPR2015-00326, Jan. 11, 2016; 26 pages.
Curriculum Vitae of Ray Vargas, *LG Electronics v. ATI Technologies ULC*, Case No. IPR2015-00325, Dec. 3, 2015; 4 pages.
Curriculum Vitae of Andrew Wolfe, Ph.D., *LG Electronics v. ATI Technologies ULC*, Case No. IPR2015-00325, Sep. 9, 2015; 5 pages.
Power of Attorney, *LG Electronics v. ATI Technologies ULC*, Case No. IPR2015-000325, Dec. 10, 2014; 2 pages.

(56) References Cited

OTHER PUBLICATIONS

ATI Technologies ULC's Power of Attorney, *LG Electronics v. ATI Technologies ULC*, Case No. IPR2015-00325, Dec. 30, 2014; 3 pages.
Patent Owner's Mandatory Notices Pursuant to 37 C.F.R. 42.8(a)(2), *LG Electronics v. ATI Technologies ULC*, Case No. IPR2015-00325, Dec. 30, 2014; 4 pages.
Notice of Filing Date Accorded to Petition and Time for Filing Patent Owner Preliminary Response, *LG Electronics v. ATI Technologies ULC*, Case No. IPR2015-00325, Jan. 12, 2015; 4 pages.
ATI Technologies ULC's Updated Mandatory Notices Pursuant to 37 C.F.R. 42.8(a)(3) and (b)(3), *LG Electronics v. ATI Technologies ULC*, Case No. IPR2015-00325, Jan. 28, 2015; 4 pages.
Petitioner's Motion to Pro Hac Vice Admission of Jamie B. Beaber Pursuant to 37 C.F.R. 42.10(c), *LG Electronics v. ATI Technologies ULC*, Case No. IPR2015-00325, Feb. 5, 2015; 7 pages.
Petitioner's Motion to Pro Hac Vice Admission of Michael Maas Pursuant to 37 C.F.R. 42.10(c), *LG Electronics v. ATI Technologies ULC*, Case No. IPR2015-00325, Feb. 5, 2015; 7 pages.
Decision Granting Petitioner's Motions for Pro Hac Vice Admission of Jamie B. Beaber and Michael Maas, *LG Electronics v. ATI Technologies ULC*, Case No. IPR2015-00325, Feb. 19, 2015; 4 pages.
Petitioner's Updated Power of Attorney, *LG Electronics v. ATI Technologies ULC*, Case No. IPR2015-00325, Feb. 26, 2015; 3 pages.
Petitioner's Updated Mandatory Notices Under 37 C.F.R. 42.8, *LG Electronics v. ATI Technologies ULC*, Case No. IPR2015-00325, Feb. 26, 2015; 5 pages.
Scheduling Order, *LG Electronics v. ATI Technologies ULC*, Case No. IPR2015-00325, Jun. 15, 2015; 8 pages.
ATI Technologies ULC's Notice of Deposition of Dr. Nader Bagherzadeh, *LG Electronics v. ATI Technologies ULC*, Case No. IPR2015-00325, Jul. 20, 2015; 3 pages.
Notice of Joint Stipulation to Modify Trial Due Dates 1 and 2, *LG Electronics v. ATI Technologies ULC*, Case No. IPR2015-00325, Jul. 26, 2015; 4 pages.
ATI Technologies ULC's Updated Mandatory Notices Pursuant to 37 C.F.R. 42.8(a)(3) and (b)(3), *LG Electronics v. ATI Technologies ULC*, Case No. IPR2015-00325, Jul. 28, 2015; 4 pages.
ATI Technologies ULC's Revised Notice of Deposition of Dr. Nader Bagherzadeh, *LG Electronics v. ATI Technologies ULC*, Case No. IPR2015-00325, Aug. 7, 2015; 3 pages.
Patent Owner's Motion to Seal Documents, *LG Electronics v. ATI Technologies ULC*, Case No. IPR2015-00325, Sep. 9, 2015; 7 pages.
Motion to Enter Protective Order, *LG Electronics v. ATI Technologies ULC*, Case No. IPR2015-00325, Sep. 9, 2015; 10 pages.
Petitioner's Objections to Evidence Under 37 C.F.R. 42.64(b)(1), *LG Electronics v. ATI Technologies ULC*, Case No. IPR2015-00325, Sep. 16, 2015; 17 pages.
Petitioner's Updated Mandatory Notices Under 37 C.F.R. 42.8, *LG Electronics v. ATI Technologies ULC*, Case No. IPR2015-00325, Oct. 6, 2015; 5 pages.
LG's Opposition to Patent Owner's Motion to Seal Documents, *LG Electronics v. ATI Technologies ULC*, Case No. IPR2015-00325, Oct. 9, 2015; 11 pages.
Petitioner's Notice of Deposition of Patent Owner's Witnesses, *LG Electronics v. ATI Technologies ULC*, Case No. IPR2015-00325, Oct. 29, 2015; 4 pages.
Notice of Joint Stipulation to Modify Trial Due Dates 2 and 4, *LG Electronics v. ATI Technologies ULC*, Case No. IPR2015-00325, Oct. 29, 2015; 4 pages.
Petitioner's Updated Mandatory Notices Under 37 C.F.R. 42.8, *LG Electronics v. ATI Technologies ULC*, Case No. IPR2015-00325, Nov. 3, 2015; 6 pages.
Patent Owner's Reply to Petitioner's Opposition to Patent Owner's Motion to Seal, *LG Electronics v. ATI Technologies ULC*, Case No. IPR2015-00325, Nov. 9, 2015; 8 pages.

Petitioner's Motion to Seal Certain ATI Documents, *LG Electronics v. ATI Technologies ULC*, Case No. IPR2015-000325, Dec. 3, 2015; 11 pages.
ATI Technologies ULC's Notice of Deposition of Raymond Vargas, *LG Electronics v. ATI Technologies ULC*, Case No. IPR2015-00325, Dec. 8, 2015; 3 pages.
Patent Owner's Objections to Evidence Pursuant to 37 C.F.R. 42.64(b)(1), *LG Electronics v. ATI Technologies ULC*, Case No. IPR2015-00325, Dec. 10, 2015; 4 pages.
Order—Conduct of the Proceeding, *LG Electronics v. ATI Technologies ULC*, Case No. IPR2015-00325, Dec. 15, 2015; 6 pages.
Patent Owner's Motion to Seal Documents, *LG Electronics v. ATI Technologies ULC*, Case No. IPR2015-00325, Dec. 23, 2015; 6 pages.
Patent Owner's Request for Oral Argument, *LG Electronics v. ATI Technologies ULC*, Case No. IPR2015-00325, Jan. 15, 2016; 4 pages.
Patent Owner's Motion to Seal Documents, *LG Electronics v. ATI Technologies ULC*, Case No. IPR2015-00325, Jan. 15, 2016; 5 pages.
Patent Owner's Motion for Observation on Cross Examination of Petitioner's Reply Witness Mr. Raymond Vargas, *LG Electronics v. ATI Technologies ULC*, Case No. IPR2015-00325, Jan. 15, 2016; 8 pages.
Petitioner's Request for Oral Argument, *LG Electronics v. ATI Technologies ULC*, Case No. IPR2015-00325, Jan. 15, 2016; 4 pages.
Petitioner's Motion to Exclude Evidence, *LG Electronics v. ATI Technologies ULC*, Case No. IPR2015-00325, Jan. 15, 2016; 17 pages.
Patent Owner's Opposition to Petitioner's Motion to Exclude, *LG Electronics v. ATI Technologies ULC*, Case No. IPR2015-00325, Jan. 20, 2016; 18 pages.
Petitioner's Motion to Seal, *LG Electronics v. ATI Technologies ULC*, Case No. IPR2015-00325, Jan. 20, 2016; 5 pages.
Petitioner's Response to Patent Owner's Motion for Observation on Cross Examination, *LG Electronics v. ATI Technologies ULC*, Case No. IPR2015-00325, Jan. 20, 2016; 9 pages.
Order—Oral Hearing, *LG Electronics v. ATI Technologies ULC*, Case No. IPR2015-00325, Jan. 22, 2016; 7 pages.
Order—Conduct of the Proceeding, *LG Electronics v. ATI Technologies ULC*, Case No. IPR2015-00325, Jan. 25, 2016; 6 pages.
Petitioner's Updated Exhibit List, *LG Electronics v. ATI Technologies ULC*, Case No. IPR2015-00325, Jan. 26, 2016; 6 pages.
Petitioner's Reply to Opposition to Motion to Exclude, *LG Electronics v. ATI Technologies ULC*, Case No. IPR2015-00325, Jan. 27, 2016; 8 pages.
Petitioner's Hearing Demonstratives, *LG Electronics v. ATI Technologies ULC*, Case No. IPR2015-00325, Feb. 5, 2016; 23 pages.
Patent Owner's Demonstrative Exhibits, *LG Electronics v. ATI Technologies ULC*, Case No. IPR2015-00325, Feb. 5, 2016; 74 pages.
Patent Owner's Updated Exhibit List, *LG Electronics v. ATI Technologies ULC*, Case No. IPR2015-00325, Feb. 8, 2016; 8 pages.
Petitioner's Updated Exhibit List, *LG Electronics v. ATI Technologies ULC*, Case No. IPR2015-00325, Feb. 9, 2016; 6 pages.
Patent Owner's Updated Exhibit List, *LG Electronics v. ATI Technologies ULC*, Case No. IPR2015-00325, Feb. 9, 2016; 8 pages.
Order—Conduct of the Proceeding, *LG Electronics v. ATI Technologies ULC*, Case No. IPR2015-00325, Feb. 11, 2016; 4 pages.
Oral Hearing Transcript, *LG Electronics v. ATI Technologies ULC*, Case No. IPR2015-00325, Apr. 8, 2016; 83 pages.
Decision Denying ATI's Motions to Seal, *LG Electronics v. ATI Technologies ULC*, Case No. IPR2015-00325, Apr. 14, 2016; 9 pages.
Decision Denying LG's Motion to Seal, *LG Electronics v. ATI Technologies ULC*, Case No. IPR2015-00325, Apr. 14, 2016; 3 pages.
Patent Owner's Demonstrative Exhibits, *LG Electronics v. ATI Technologies ULC*, Case Nos. IPR2015-00325, -00326, and -00330, Feb. 10, 2016; 71 pages.

(56) References Cited

OTHER PUBLICATIONS

Response to Petitioner's Objections to Evidence, *LG Electronics v. ATI Technologies ULC*, Case No. IPR2015-00325, Sep. 30, 2015; 8 pages.
Supplemental Declaration of Dr. Andrew Wolfe, *LG Electronics v. ATI Technologies ULC*, Case No. IPR2015-00325, Sep. 29, 2016; 3 pages.
Power of Attorney, *LG Electronics v. ATI Technologies ULC*, Case No. IPR2015-00326, Dec. 10, 2014; 2 pages.
ATI Technologies ULC's Power of Attorney, *LG Electronics v. ATI Technologies ULC*, Case No. IPR2015-00326, Dec. 30, 2014; 3 pages.
Patent Owner's Mandatory Notices Pursuant to 37 C.F.R. 42.8(a)(2), *LG Electronics v. ATI Technologies ULC*, Case No. IPR2015-00326, Dec. 30, 2014; 4 pages.
Notice of Filing Date Accorded to Petition and Time for Filing Patent Owner Preliminary Response, *LG Electronics v. ATI Technologies ULC*, Case No. IPR2015-00326, Jan. 12, 2015; 4 pages.
Petitioner's Motion to Pro Hac Vice Admission of Jamie B. Beaber Pursuant to 37 C.F.R. 42.10(c), *LG Electronics v. ATI Technologies ULC*, Case No. IPR2015-00326, Feb. 5, 2015; 7 pages.
Petitioner's Motion to Pro Hac Vice Admission of Michael Maas Pursuant to 37 C.F.R. 42.10(c), *LG Electronics v. ATI Technologies ULC*, Case No. IPR2015-00326, Feb. 5, 2015; 7 pages.
Decision Granting Petitioner's Motions for Pro Hac Vice Admission of Jamie B. Beaber and Michael Maas, *LG Electronics v. ATI Technologies ULC*, Case No. IPR2015-00326, Feb. 19, 2015; 4 pages.
Petitioner's Updated Power of Attorney, *LG Electronics v. ATI Technologies ULC*, Case No. IPR2015-00326, Feb. 26, 2015; 3 pages.
Petitioner's Updated Mandatory Notices Under 37 C.F.R. 42.8, *LG Electronics v. ATI Technologies ULC*, Case No. IPR2015-00326, Feb. 26, 2015; 5 pages.
ATI Technologies ULC's Updated Mandatory Notices Pursuant to 37 C.F.R. 42.8(a)(3) and (b)(3), *LG Electronics v. ATI Technologies ULC*, Case No. IPR2015-00326, Apr. 10, 2015; 4 pages.
Scheduling Order, *LG Electronics v. ATI Technologies ULC*, Case No. IPR2015-00326, Jul. 10, 2015; 7 pages.
Petitioner's Request for Rehearing Under 37 C.F.R. 42.71(c) and (d), *LG Electronics v. ATI Technologies ULC*, Case No. IPR2015-00326, Jul. 24, 2015; 17 pages.
ATI Technologies ULC's Notice of Deposition of Dr. Nader Bagherzadeh, *LG Electronics v. ATI Technologies ULC*, Case No. IPR2015-00326, Aug. 4, 2015; 3 pages.
Decision on Request for Rehearing, *LG Electronics v. ATI Technologies ULC*, Case No. IPR2015-00326, Sep. 2, 2015; 6 pages.
Joint Notice of Stipulation to Modify Trial Due Dates 1 and 2, *LG Electronics v. ATI Technologies ULC*, Case No. IPR2015-00326, Oct. 8, 2015; 4 pages.
Patent Owner's Motion to Seal Documents, *LG Electronics v. ATI Technologies ULC*, Case No. IPR2015-00326, Oct. 15, 2015; 18 pages.
Petitioner's Objections to Evidence Under 37 C.F.R. 42.64(b)(1), *LG Electronics v. ATI Technologies ULC*, Case No. IPR2015-00326, Oct. 22, 2015; 14 pages.
Petitioner's Notice of Deposition of Patent Owner's Witnesses, *LG Electronics v. ATI Technologies ULC*, Case No. IPR2015-00326, Oct. 29, 2015; 4 pages.
Petitioner's Updated Mandatory Notices Under 37 C.F.R. 42.8, *LG Electronics v. ATI Technologies ULC*, Case No. IPR2015-00326, Nov. 3, 2015; 6 pages.
LG's Opposition to Patent Owner's Motion to Seal Documents, *LG Electronics v. ATI Technologies ULC*, Case No. IPR2015-00326, Nov. 16, 2015; 9 pages.
Patent Owner's Reply to Petitioner's Opposition to the Motion to Seal Documents, *LG Electronics v. ATI Technologies ULC*, Case No. IPR2015-00326, Dec. 16, 2015; 7 pages.

Petitioner's Motion to Seal Documents, *LG Electronics v. ATI Technologies ULC*, Case No. IPR2015-00326, Jan. 11, 2016; 10 pages.
Patent Owner's Objections to Evidence Pursuant to 37 C.F.R. 42.64(b)(1), *LG Electronics v. ATI Technologies ULC*, Case No. IPR2015-00326, Jan. 19, 2016; 3 pages.
ATI Technologies ULC's Notice of Deposition of Raymond Vargas, *LG Electronics v. ATI Technologies ULC*, Case No. IPR2015-00326, Feb. 1, 2016; 3 pages.
Authorization for Sur-Reply or Motion for Observations on Cross Examination, *LG Electronics v. ATI Technologies ULC*, Case No. IPR2015-00326, Feb. 4, 2016; 5 pages.
Patent Owner's Demonstrative Exhibits, *LG Electronics v. ATI Technologies ULC*, Case No. IPR2015-00326, Feb. 5, 2016; 74 pages.
Patent Owner's Updated Exhibit List, *LG Electronics v. ATI Technologies ULC*, Case No. IPR2015-00326, Feb. 8, 2016; 8 pages.
Patent Owner's Updated Exhibit List, *LG Electronics v. ATI Technologies ULC*, Case No. IPR2015-00326, Feb. 9, 2016; 8 pages.
Patent Owner's Sur-Reply to Petitioner's Reply, *LG Electronics v. ATI Technologies ULC*, Case No. IPR2015-00326, Feb. 9, 2016; 11 pages.
Order—Conduct of the Proceeding, *LG Electronics v. ATI Technologies ULC*, Case No. IPR2015-00326, Feb. 11, 2016; 4 pages.
Petitioner's Request for Oral Argument, *LG Electronics v. ATI Technologies ULC*, Case No. IPR2015-00326, Mar. 2, 2016; 4 pages.
Patent Owner's Request for Oral Argument, *LG Electronics v. ATI Technologies ULC*, Case No. IPR2015-00326, Mar. 2, 2016; 4 pages.
Petitioner's Motion to Exclude Evidence, *LG Electronics v. ATI Technologies ULC*, Case No. IPR2015-00326, Mar. 2, 2016; 18 pages.
Patent Owner's Opposition to Petitioner's Motion to Exclude, *LG Electronics v. ATI Technologies ULC*, Case No. IPR2015-00326, Mar. 16, 2016; 19 pages.
Order—Trial Hearing, *LG Electronics v. ATI Technologies ULC*, Case No. IPR2015-00326, Mar. 22, 2016; 5 pages.
Petitioner's Reply to Opposition to Motion to Exclude, *LG Electronics v. ATI Technologies ULC*, Case No. IPR2015-00326, Mar. 23, 2016; 8 pages.
Petitioner's Updated Exhibit List, *LG Electronics v. ATI Technologies ULC*, Case No. IPR2015-00326, Apr. 4, 2016; 6 pages.
Patent Owner's Updated Exhibit List, *LG Electronics v. ATI Technologies ULC*, Case No. IPR2015-00326, Apr. 4, 2016; 8 pages.
Record of Oral Hearing, *LG Electronics v. ATI Technologies ULC*, Case Nos. IPR2015-00325, -00326, and -00330, Apr. 13, 2016; 83 pages.
Record of Oral Hearing, *LG Electronics v. ATI Technologies ULC*, Case No. IPR2015-00326, May 16, 2016; 40 pages.
Patent Owner's Demonstrative Exhibits, *LG Electronics v. ATI Technologies ULC*, Case No. IPR2015-00326, Feb. 3, 2016; 74 pages.
Power of Attorney, *LG Electronics v. ATI Technologies ULC*, Case No. IPR2015-00330, Nov. 26, 2014; 2 pages.
ATI Technologies ULC's Power of Attorney, *LG Electronics v. ATI Technologies ULC*, Case No. IPR2015-00330, Dec. 30, 2013; 3 pages.
Patent Owner's Mandatory Notices Pursuant to 37 C.F.R. 42.8(a)(2), *LG Electronics v. ATI Technologies ULC*, Case No. IPR2015-00330, Dec. 30, 2014; 4 pages.
Notice of Filing Date Accorded to Petition and Time for Filing Patent Owner Preliminary Response, *LG Electronics v. ATI Technologies ULC*, Case No. IPR2015-00330, Jan. 12, 2015; 4 pages.
Petitioner's Motion for Pro Hac Vice Admission of Jamie B. Beaber Pursuant to 37 C.F.R. 42.10(c), *LG Electronics v. ATI Technologies ULC*, Case No. IPR2015-00330, Feb. 5, 2015; 7 pages.
Petitioner's Motion for Pro Hac Vice Admission of Michael Maas Pursuant to 37 C.F.R. 42.10(c), *LG Electronics v. ATI Technologies ULC*, Case No. IPR2015-00330, Feb. 5, 2015; 7 pages.
Decision Granting Petitioner's Motions for Pro Hac Vice Admission of Jaime B. Beaber and Michael Maas, *LG Electronics v. ATI*

(56) References Cited

OTHER PUBLICATIONS

*Technologies ULC*, Case Nos. IPR2015-00321 -00322 -00325 -00326 -00327 and -00330, Feb. 19, 2015; 4 pages.
Petitioner's Updated Power of Attorney, *LG Electronics v. ATI Technologies ULC*, Case No. IPR2015-00330, Feb. 26, 2015; 3 pages.
Petitioner's Updated Mandatory Notices Under 37 C.F.R. 42.8, *LG Electronics v. ATI Technologies ULC*, Case No. IPR2015-00330, Feb. 26, 2015; 5 pages.
ATI Technologies ULC's Updated Mandatory Notices Pursuant to 37 C.F.R. 42.8(a)(3) and (b)(3), *LG Electronics v. ATI Technologies ULC*, Case No. IPR2015-00330, Apr. 10, 2015; 4 pages.
Scheduling Order, *LG Electronics v. ATI Technologies ULC*, Case Nos. IPR2015-00326 and -00330, Jul. 10, 2015; 7 pages.
Petitioner's Request for Rehearing Under 37 C.F.R. 42.71(c) and (d), *LG Electronics v. ATI Technologies ULC*, Case No. IPR2015-00330, Jul. 24, 2015; 16 pages.
ATI Technologies ULC's Notice of Deposition of Dr. Nader Bagherzadeh, *LG Electronics v. ATI Technologies ULC*, Case No. IPR2015-00330, Aug. 4, 2015; 3 pages.
Decision Denying Request for Rehearing, *LG Electronics v. ATI Technologies ULC*, Case No. IPR2015-00330, Sep. 2, 2015; 5 pages.
Joint Notice of Stipulation to Modify Trial Due Dates 1 and 2, *LG Electronics v. ATI Technologies ULC*, Case No. IPR2015-00330, Oct. 8, 2015; 4 pages.
Patent Owner's Motion to Seal Documents, *LG Electronics v. ATI Technologies ULC*, Case No. IPR2015-00330, Oct. 15, 2015; 18 pages.
Petitioner's Objections to Evidence Under 37 C.F.R. 42.64(b)(1), *LG Electronics v. ATI Technologies ULC*, Case No. IPR2015-00330, Oct. 22, 2015; 14 pages.
Petitioner's Notice of Deposition of Patent Owner's Witnesses, *LG Electronics v. ATI Technologies ULC*, Case No. IPR2015-00330, Oct. 29, 2015; 4 pages.
Petitioner's Updated Mandatory Notices Under 37 C.F.R. 42.8, *LG Electronics v. ATI Technologies ULC*, Case No. IPR2015-00330, Nov. 3, 2015; 6 pages.
LG's Opposition to Patent Owner's Motion to Seal Documents, *LG Electronics v. ATI Technologies ULC*, Case No. IPR2015-00330, Nov. 16, 2015; 9 pages.
Patent Owner's Reply to Petitioner's Opposition to the Motion to Seal Documents, *LG Electronics v. ATI Technologies ULC*, Case No. IPR2015-00330, Dec. 16, 2015; 7 pages.
Petitioner's Motion to Seal Documents, *LG Electronics v. ATI Technologies ULC*, Case No. IPR2015-00330, Jan. 11, 2016; 10 pages.
Patent Owner's Objections to Evidence Pursuant to 37 C.F.R. 42.64(b)(1), *LG Electronics v. ATI Technologies ULC*, Case No. IPR2015-00330, Jan. 19, 2016; 3 pages.
ATI Technologies ULC's Notice of Deposition of Raymond Vargas, *LG Electronics v. ATI Technologies ULC*, Case No. IPR2015-00330, Feb. 1, 2016; 3 pages.
Authorization for Sur-Reply or Motion for Observations on Cross Examination, *LG Electronics v. ATI Technologies ULC*, Case Nos. IPR2015-00326 and -00330, Feb. 4, 2016; 5 pages.
Patent Owner's Demonstrative Exhibits, *LG Electronics v. ATI Technologies ULC*, Case No. IPR2015-00330, Feb. 10, 2016; 74 pages.
Patent Owner's Updated Exhibit List, *LG Electronics v. ATI Technologies ULC*, Case No. IPR2015-00330, Feb. 8, 2016; 8 pages.
Patent Owner's Updated Exhibit List, *LG Electronics v. ATI Technologies ULC*, Case No. IPR2015-00330, Feb. 9, 2016; 8 pages.
Patent Owner's Sur-Reply to Petitioner's Reply, *LG Electronics v. ATI Technologies ULC*, Case No. IPR2015-00330, Feb. 9, 2016; 11 pages.
Order—Conduct of the Proceeding, *LG Electronics v. ATI Technologies ULC*, Case Nos. IPR2015-00325 -00326 and -00330, Feb. 11, 2016; 4 pages.

Petitioner's Motion to Exclude Evidence, *LG Electronics v. ATI Technologies ULC*, Case No. IPR2015-00330, Mar. 2, 2016; 18 pages.
Patent Owner's Opposition to Petitioner's Motion to Exclude, *LG Electronics v. ATI Technologies ULC*, Case No. IPR2015-00330, Mar. 16, 2016; 19 pages.
Petitioner's Reply to Opposition to Motion to Exclude, *LG Electronics v. ATI Technologies ULC*, Case No. IPR2015-00330, Mar. 23, 2016; 8 pages.
Patent Owner's Demonstrative Exhibits, *LG Electronics v. ATI Technologies ULC*, Case No. IPR2015-00330, Feb. 3, 2016; 74 pages.
ATI Technologies ULC's Updated Mandatory Notices Pursuant to 37 C.F.R. 42.8(a)(3) and (b)(3), *LG Electronics, Inc. v. ATI Technologies ULC*, IPR2015-00325, Jun. 15, 2016; 4 pages.
Updated Power of Attorney, *LG Electronics, Inc. v. ATI Technologies ULC*, IPR2015-00325, Jun. 15, 2016; 3 pages.
Power of Attorney, *LG Electronics, Inc. v. ATI Technologies ULC*, IPR2015-00327, Dec. 10, 2014; 2 pages.
Petition for *Inter Partes* Review of U.S. Pat. No. 6,897,871, *LG Electronics, Inc. v. ATI Technologies ULC*, IPR2015-00327, Dec. 10, 2014; 66 pages.
ATI Technologies ULC's Power of Attorney Pursuant to 37 C.F.R. 42.10(b), *LG Electronics, Inc. v. ATI Technologies ULC*, IPR2015-00327, Dec. 30, 2014; 3 pages.
Patent Owner Mandatory Notices Pursuant to 37 C.F.R. 42.8(a)(2), *LG Electronics, Inc. v. ATI Technologies ULC*, IPR2015-00327, Dec. 30, 2014; 4 pages.
Notice of Filing Date Accorded to Petition and Time for Filing Patent Owner Preliminary Response, *LG Electronics, Inc. v. ATI Technologies ULC*, IPR2015-00327, Jan. 12, 2015; 4 pages.
Petitioner's Motion for Pro Hac Vice Admission of Jamie B. Beaber Pursuant to 37 C.F.R. 42.10(c), *LG Electronics, Inc. v. ATI Technologies ULC*, IPR2015-00327, Feb. 5, 2015; 7 pages.
Petitioner's Motion for Pro Hac Vice Admission of Michael Maas Pursuant to 37 C.F.R. 42.10(c), *LG Electronics, Inc. v. ATI Technologies ULC*, IPR2015-00327, Feb. 5, 2015; 7 pages.
Decision Granting Petitioner's Motions for Pro Hac Vice Admission of Jamie B. Beaber and Michael M. Maas, *LG Electronics, Inc. v. ATI Technologies ULC*, IPR2015-00327, Feb. 19, 2015; 4 pages.
Petitioner's Updated Power of Attorney, *LG Electronics, Inc. v. ATI Technologies ULC*, IPR2015-00327, Feb. 26, 2015; 3 pages.
Petitioner's Updated Mandatory Notices Under 37 C.F.R. 42.8, *LG Electronics, Inc. v. ATI Technologies ULC*, IPR2015-00327, Feb. 26, 2015; 5 pages.
ATI Technologies ULC's Updated Mandatory Notices Pursuant to 37 C.F.R. 42.8(a)(3) and (b)(3), *LG Electronics, Inc. v. ATI Technologies ULC*, IPR2015-00327, Apr. 10, 2015; 4 pages.
Patent Owner ATI Technologies ULC's Preliminary Response Pursuant to 37 C.F.R. 42.107, *LG Electronics, Inc. v. ATI Technologies ULC*, IPR2015-00327, Apr. 13, 2015; 42 pages.
Decision Denying Institution of *Inter Partes* Review, *LG Electronics, Inc. v. ATI Technologies ULC*, IPR2015-00327, Jul. 10, 2015; 13 pages.
Petitioner's Request for Rehearing Under 37 C.F.R. 42.71(c) and (d), *LG Electronics, Inc. v. ATI Technologies ULC*, IPR2015-00327, Aug. 10, 2015; 12 pages.
Decision Denying Request for Rehearing, *LG Electronics, Inc. v. ATI Technologies ULC*, IPR2015-00327, Sep. 2, 2015; 6 pages.
Petitioner's Request for Refund of Post-Institution Fees, *LG Electronics, Inc. v. ATI Technologies ULC*, IPR2015-00327, Nov. 2, 2015; 4 pages.
Notice of Refund, *LG Electronics, Inc. v. ATI Technologies ULC*, IPR2015-00327, Nov. 3, 2015; 2 pages.
Declaration of Dr. Nader Bagherzadeh, *LG Electronics, Inc. v. ATI Technologies ULC*, IPR2015-00327, Dec. 10, 2014; 105 pages.
Owens, et al., "Polygon Rendering on a Stream Architecture," Proceedings of the 2000 Eurographics/SIGGRAPH Workshop on Graphics Hardware, Aug. 2000; pp. 23-32.
Patent Owner's Notice of Appeal, *LG Electronics, Inc. v. ATI Technologies ULC*, IPR2015-00325, Jun. 15, 2016; 8 pages.
OpenGL Overview, accessed Nov. 23, 2014, https://www.opengl.org/about/#1; 5 pages.

(56) References Cited

OTHER PUBLICATIONS

EP Office Action; EP Application No. 10075685.7, dated Jan. 19, 2012.
EP Office Action; EP Application No. 10075687.3, dated Jan. 19, 2012.
EP Office Action; EP Application No. 10075688.1, dated Jan. 19, 2012.
EP Office Action; EP Application No. 14188610.1, dated Apr. 23, 2015.
Khailany et al., "Imagine: Media Processing with Streams," IEEE Micro, IEEE Service Center; Mar. 2001.
Petitioner's Notice of Appeal, *LG Electronics* v. *ATI Technologies ULC*, Case No. IPR2015-00326, Jul. 15, 2016; 26 pages.
ATI Technologies ULC's Updated Mandatory Notices, *LG Electronics* v. *ATI Technologies ULC*, Case No. IPR2015-00326, Jul. 29, 2016; 4 pages.
ATI Technologies ULC's Updated Power of Attorney, *LG Electronics* v. *ATI Technologies ULC*, Case No. IPR2015-00326, Jul. 29, 2016; 3 pages.
Patent Owner's Notice of Cross-Appeal, *LG Electronics* v. *ATI Technologies ULC*, Case No. IPR2015-00326, Jul. 29, 2016; 6 pages.
ATI Technologies ULC's Updated Mandatory Notices, *LG Electronics* v. *ATI Technologies ULC*, Case No. IPR2015-00330, Sep. 2, 2016; 4 pages.
ATI Technologies ULC's Updated Power of Attorney, *LG Electronics* v. *ATI Technologies ULC*, Case No. IPR2015-00330, Sep. 2, 2016; 3 pages.
Patent Owner's Notice of Appeal, *LG Electronics* v. *ATI Technologies ULC*, Case No. IPR2015-00330, Sep. 2, 2016; 6 pages.
Deering, Michael F. et al., "Leo: A system for Cost Effective 3D Shaded Graphics", SIGGRAPH 93; Aug. 1-6, 1993; pp. 101-108, XP058113834.

\* cited by examiner

GRAPHICS PROCESSING ARCHITECTURE EMPLOYING A UNIFIED SHADER

CROSS-REFERENCE TO RELATED APPLICATIONS

This application is a continuation of U.S. application Ser. No. 17/230,129, filed Apr. 14, 2021, which is a continuation of U.S. application Ser. No. 17/005,703 (now U.S. Pat. No. 11,023,996), filed on Aug. 28, 2020, which is a continuation of U.S. application Ser. No. 16/601,260 (now U.S. Pat. No. 10,796,400), filed on Oct. 14, 2019, which is a continuation of U.S. application Ser. No. 15/193,647 (now U.S. Pat. No. 10,489,876), filed on Jun. 27, 2016, which is a continuation of U.S. application Ser. No. 14/614,967 (now U.S. Pat. No. 9,582,846), filed on Feb. 5, 2015, which is a continuation of U.S. application Ser. No. 14/312,014, filed Jun. 23, 2014, which is a continuation of U.S. application Ser. No. 13/109,738 (now U.S. Pat. No. 8,760,454), filed May 17, 2011, which is a continuation of U.S. application Ser. No. 12/791,597, filed Jun. 1, 2010, which is a continuation of U.S. application Ser. No. 11/842,256, filed Aug. 21, 2007, which is a continuation of U.S. application Ser. No. 11/117,863 (now U.S. Pat. No. 7,327,369), filed Apr. 29, 2005, which is a continuation of U.S. application Ser. No. 10/718,318 (now U.S. Pat. No. 6,897,871), filed on Nov. 20, 2003, which are owned by instant assignee and the entirety of each of the foregoing applications is incorporated by reference herein.

FIELD OF THE INVENTION

The present invention generally relates to graphics processors and, more particularly, to a graphics processor architecture employing a single shader.

BACKGROUND OF THE INVENTION

In computer graphics applications, complex shapes and structures are formed through the sampling, interconnection and rendering of more simple objects, referred to as primitives. An example of such a primitive is a triangle, or other suitable polygon. These primitives, in turn, are formed by the interconnection of individual pixels. Color and texture are then applied to the individual pixels that comprise the shape based on their location within the primitive and the primitives orientation with respect to the generated shape; thereby generating the object that is rendered to a corresponding display for subsequent viewing.

The interconnection of primitives and the application of color and textures to generated shapes are generally performed by a graphics processor. Conventional graphics processors include a series of shaders that specify how and with what corresponding attributes, a final image is drawn on a screen, or suitable display device. As illustrated in FIG. 1, a conventional shader 10 can be represented as a processing block 12 that accepts a plurality of bits of input data, such as, for example, object shape data (14) in object space (x,y,z); material properties of the object, such as color (16); texture information (18); luminance information (20); and viewing angle information (22) and provides output data (28) representing the object with texture and other appearance properties applied thereto (x', y', z').

In exemplary fashion, as illustrated in FIGS. 2A-2B, the shader accepts the vertex coordinate data representing cube 30 (FIG. 2A) as inputs and provides data representing, for example, a perspectively corrected view of the cube 30' (FIG. 2B) as an output. The corrected view may be provided, for example, by applying an appropriate transformation matrix to the data representing the initial cube 30. More specifically, the representation illustrated in FIG. 2B is provided by a vertex shader that accepts as inputs the data representing, for example, vertices $V_X$, $V_Y$ and $V_Z$, among others of cube 30 and providing angularly oriented vertices $V_{X'}$, $V_{Y'}$ and $V_{Z'}$, including any appearance attributes of corresponding cube 30'.

In addition to the vertex shader discussed above, a shader processing block that operates on the pixel level, referred to as a pixel shader is also used when generating an object for display. Generally, the pixel shader provides the color value associated with each pixel of a rendered object. Conventionally, both the vertex shader and pixel shader are separate components that are configured to perform only a single transformation or operation. Thus, in order to perform a position and a texture transformation of an input, at least two shading operations and hence, at least two shaders, need to be employed. Conventional graphics processors require the use of both a vertex shader and a pixel shader in order to generate an object. Because both types of shaders are required, known graphics processors are relatively large in size, with most of the real estate being taken up by the vertex and pixel shaders.

In addition to the real estate penalty associated with conventional graphics processors, there is also a corresponding performance penalty associated therewith. In conventional graphics processors, the vertex shader and the pixel shader are juxtaposed in a sequential, pipelined fashion, with the vertex shader being positioned before and operating on vertex data before the pixel shader can operate on individual pixel data.

Thus, there is a need for an improved graphics processor employing a shader that is both space efficient and computationally effective.

BRIEF DESCRIPTION OF THE DRAWINGS

The present invention and the associated advantages and features thereof, will become better understood and appreciated upon review of the following detailed description of the invention, taken in conjunction with the following drawings, where like numerals represent like elements, in which.

DETAILED DESCRIPTION OF THE INVENTION

Briefly stated, the present invention is directed to a graphics processor that employs a unified shader that is capable of performing both the vertex operations and the pixel operations in a space saving and computationally efficient manner. In an exemplary embodiment, a graphics processor according to the present invention includes an arbiter circuit for selecting one of a plurality of inputs for processing in response to a control signal; and a shader, coupled to the arbiter, operative to process the selected one of the plurality of inputs, the shader including means for performing vertex operations and pixel operations, and wherein the shader performs one of the vertex operations or pixel operations based on the selected one of the plurality of inputs.

The shader includes a general purpose register block for storing at least the plurality of selected inputs, a sequencer for storing logical and arithmetic instructions that are used to perform vertex and pixel manipulation operations and a processor capable of executing both floating point arithmetic and logical operations on the selected inputs according to the instructions maintained in the sequencer. The shader of the present invention is referred to as a "unified" shader because it is configured to perform both vertex and pixel operations. By employing the unified shader of the present invention, the associated graphics processor is more space efficient than conventional graphics processors because the unified shader takes up less real estate than the conventional multi-shader processor architecture.

In addition, according to the present invention, the unified shader is more computationally efficient because it allows the shader to be flexibly allocated to pixels or vertices based on workload.

Figure 1:
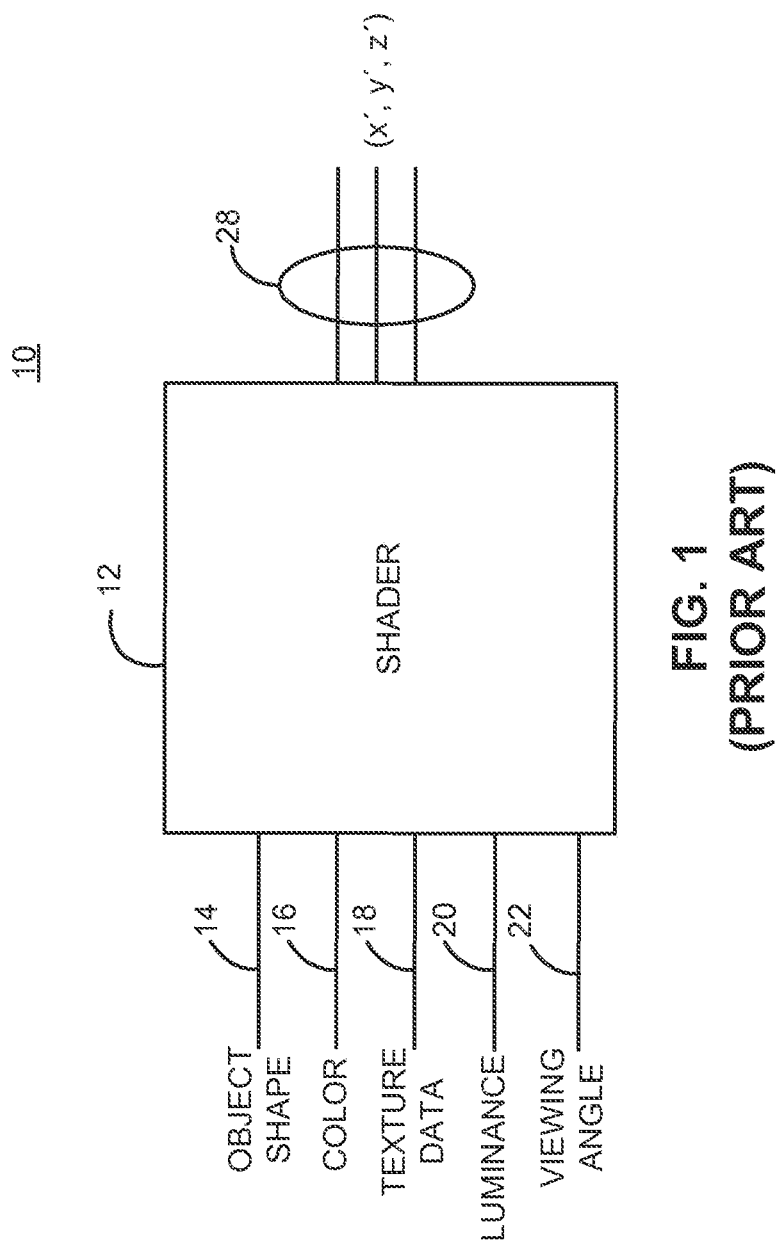
FIG. 1 is a schematic block diagram of a conventional shader.
Figure 2A:
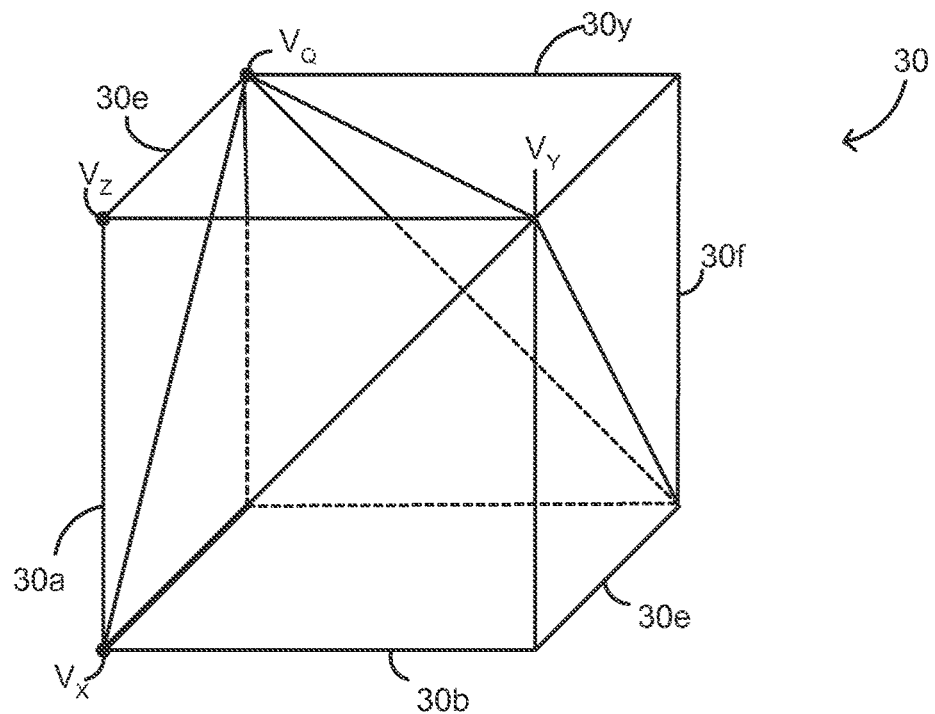
FIGS. 2A-2B are graphical representations of the operations performed by the shader illustrated in FIG. 1.
Figure 2B:
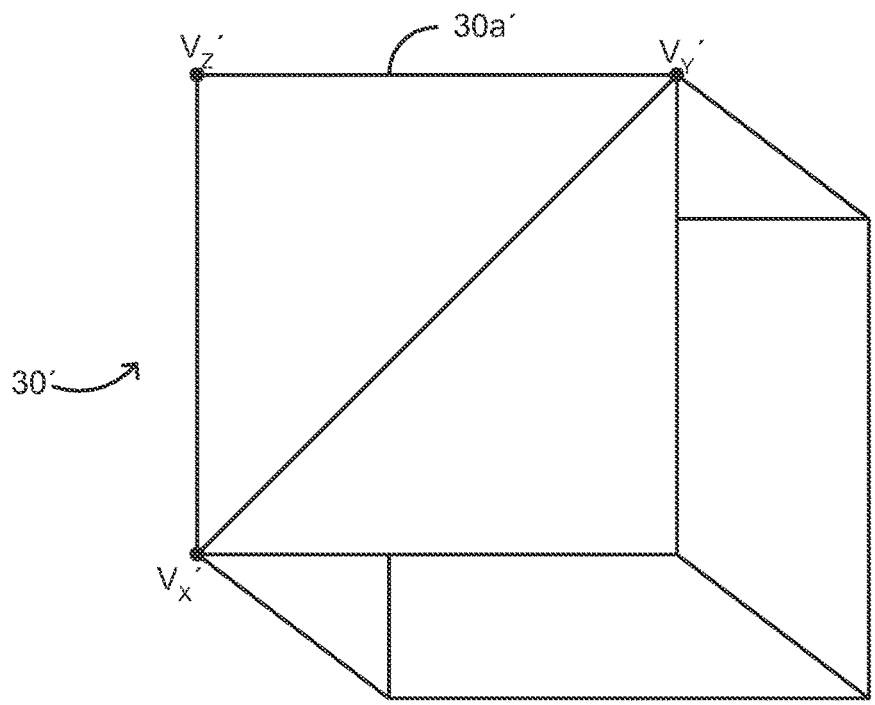
Figure 3:
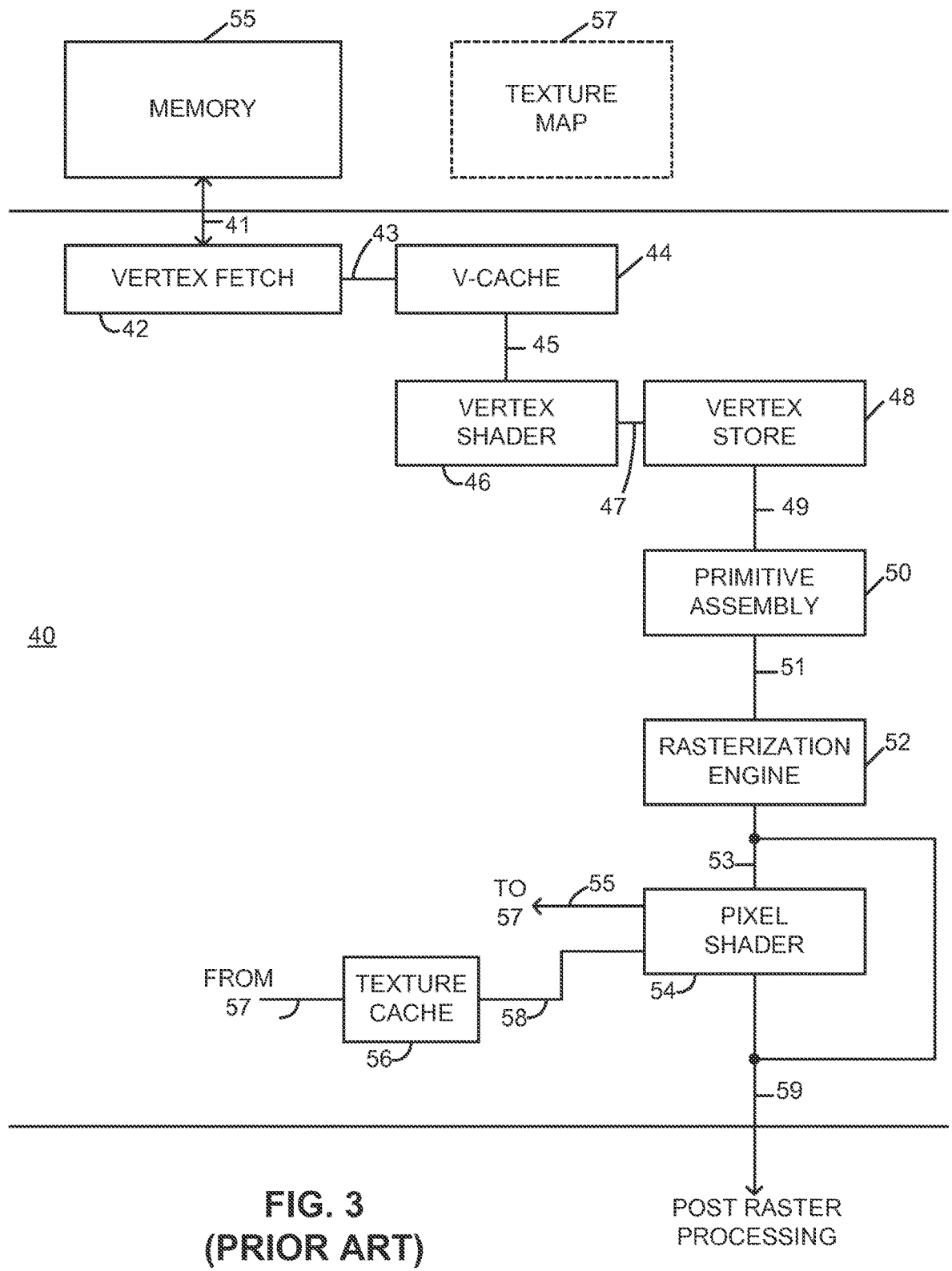
FIG. 3 is a schematic block diagram of a conventional graphics processor architecture.

Referring now to FIG. 3, illustrated therein is a graphics processor incorporating a conventional pipeline architecture. As shown, the graphics processor 40 includes a vertex fetch block 42 which receives vertex information relating to a primitive to be rendered from an off-chip memory 55 on line 41. The fetched vertex data is then transmitted to a vertex cache 44 for storage on line 43. Upon request, the vertex data maintained in the vertex cache 44 is transmitted to a vertex shader 46 on line 45. As discussed above, an example of the information that is requested by and transmitted to the vertex shader 46 includes the object shape, material properties (e.g. color), texture information, and viewing angle. Generally, the vertex shader 46 is a programmable mechanism which applies a transformation position matrix to the input position information (obtained from the vertex cache 44), thereby providing data representing a perspectively corrected image of the object to be rendered, along with any texture or color coordinates thereof.

After performing the transformation operation, the data representing the transformed vertices are then provided to a vertex store 48 on line 47. The vertex store 48 then transmits the modified vertex information contained therein to a primitive assembly block 50 on line 49. The primitive assembly block 50 assembles, or converts, the input vertex information into a plurality of primitives to be subsequently processed. Suitable methods of assembling the input vertex information into primitives is known in the art and will not be discussed in greater detail here. The assembled primitives are then transmitted to a rasterization engine 52, which converts the previously assembled primitives into pixel data through a process referred to as walking. The resulting pixel data is then transmitted to a pixel shader 54 on line 53.

The pixel shader 54 generates the color and additional appearance attributes that are to be applied to a given pixel, and applies the appearance attributes to the respective pixels. In addition, the pixel shader 54 is capable of fetching texture data from a texture map 57 as indexed by the pixel data from the rasterization engine 52 by transmitting such information on line 55 to the texture map. The requested texture data is then transmitted back from the texture map 57 on line 57' and stored in a texture cache 56 before being routed to the pixel shader on line 58. Once the texture data has been received, the pixel shader 54 then performs specified logical or arithmetic operations on the received texture data to generate the pixel color or other appearance attribute of interest. The generated pixel appearance attribute is then combined with a base color, as provided by the rasterization engine on line 53, to thereby provide a pixel color to the pixel corresponding at the position of interest. The pixel appearance attribute present on line 59 is then transmitted to post raster processing blocks (not shown).

As described above, the conventional graphics processor 40 requires the use of two separate shaders: a vertex shader 46 and a pixel shader 54. A drawback associated with such an architecture is that the overall footprint of the graphics processor is relatively large as the two shaders take up a large amount of real estate. Another drawback associated with conventional graphics processor architectures is that can exhibit poor computational efficiency.

Figure 4A:
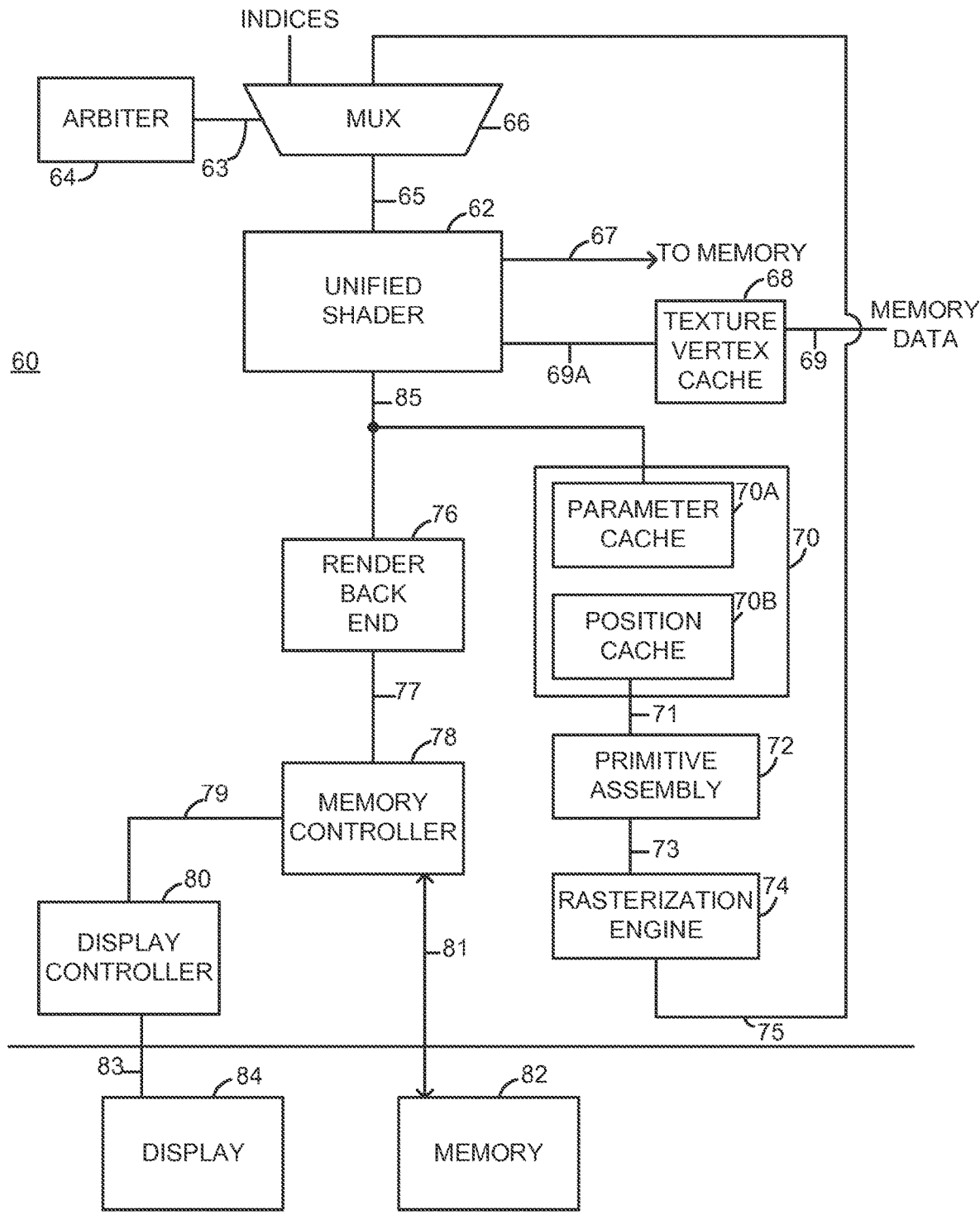
FIG. 4A is a schematic block diagram of a graphics processor architecture according to the present invention.

Referring now to FIG. 4A, in an exemplary embodiment, the graphics processor 60 of the present invention includes a multiplexer 66 having vertex (e.g. indices) data provided at a first input thereto and interpolated pixel parameter (e.g. position) data and attribute data from a rasterization engine 74 provided at a second input. A control signal generated by an arbiter 64 is transmitted to the multiplexer 66 on line 63. The arbiter 64 determines which of the two inputs to the multiplexer 66 is transmitted to a unified shader 62 for further processing. The arbitration scheme employed by the arbiter 64 is as follows: the vertex data on the first input of the multiplexer 66 is transmitted to the unified shader 62 on line 65 if there is enough resources available in the unified shader to operate on the vertex data; otherwise, the interpolated pixel parameter data present on the second input will be passed to the unified shader 62 for further processing.

Figure 5:
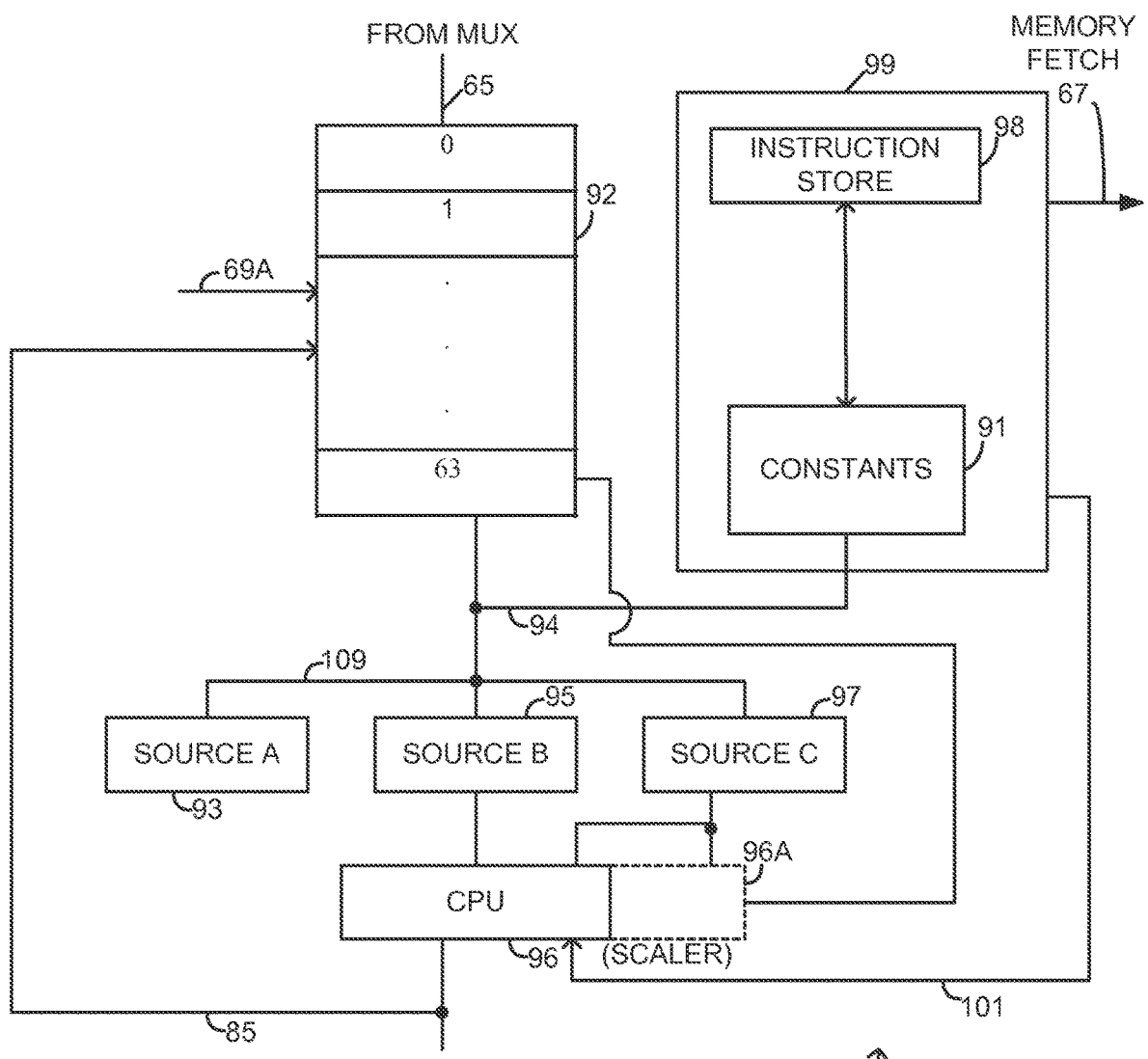
FIG. 5 is an exploded schematic block diagram of the unified shader employed in the graphics processor illustrated in FIG. 4A.

Referring briefly to FIG. 5, the unified shader 62 will now be described. As illustrated, the unified shader 62 includes a general purpose register block 92, a plurality of source registers: including source register A 93, source register B 95, and source register C 97, a processor (e.g. CPU) 96 and a sequencer 99. The general purpose register block 92 includes sixty four registers, or available entries, for storing the information transmitted from the multiplexer 66 on line 65 or any other information to be maintained within the unified shader. The data present in the general purpose register block 92 is transmitted to the plurality of source registers via line 109.

The processor 96 may be comprised of a dedicated piece of hardware or can be configured as part of a general purpose computing device (i.e. personal computer). In an exemplary embodiment, the processor 96 is adapted to perform 32-bit floating point arithmetic operations as well as a complete series of logical operations on corresponding operands. As shown, the processor is logically partitioned into two sections. Section 96 is configured to execute, for example, the 32-bit floating point arithmetic operations of the unified shader. The second section, 96A, is configured to perform scaler operations (e.g. log, exponent, reciprocal square root) of the unified shader.

The sequencer 99 includes constants block 91 and an instruction store 98. The constants block 91 contains, for example, the several transformation matrices used in connection with vertex manipulation operations. The instruction store 98 contains the necessary instructions that are executed by the processor 96 in order to perform the respective arithmetic and logic operations on the data maintained in the general purpose register block 92 as provided by the source registers 93-95. The instruction store 98 further includes memory fetch instructions that, when executed, causes the unified shader 62 to fetch texture and other types of data, from memory 82 (FIG. 4A). In operation, the sequencer 99 determines whether the next instruction to be executed (from the instruction store 98) is an arithmetic or logical instruction or a memory (e.g. texture fetch) instruction. If the next instruction is a memory instruction or request, the sequencer 99 sends the request to a fetch block (not shown) which retrieves the required information from memory 82 (FIG. 4A). The retrieved information is then transmitted to the sequencer 99, through the vertex texture cache 68 (FIG. 4A) as described in greater detail below.

If the next instruction to be executed is an arithmetic or logical instruction, the sequencer 99 causes the appropriate operands to be transferred from the general purpose register block 92 into the appropriate source registers (93, 95, 97) for execution, and an appropriate signal is sent to the processor 96 on line 101 indicating what operation or series of operations are to be executed on the several operands present in the source registers. At this point, the processor 96 executes the instructions on the operands present in the source registers and provides the result on line 85. The information present on line 85 may be transmitted back to the general purpose register block 92 for storage, or transmitted to succeeding components of the graphics processor 60.

As discussed above, the instruction store 98 maintains both vertex manipulation instructions and pixel manipulation instructions. Therefore, the unified shader 99 of the present invention is able to perform both vertex and pixel operations, as well as execute memory fetch operations. As such, the unified shader 62 of the present invention is able to perform both the vertex shading and pixel shading operations on data in the context of a graphics controller based on information passed from the multiplexer. By being adapted to perform memory fetches, the unified shader of the present invention is able to perform additional processes that conventional vertex shaders cannot perform; while at the same time, perform pixel operations.

The unified shader 62 has ability to simultaneously perform vertex manipulation operations and pixel manipulation operations at various degrees of completion by being able to freely switch between such programs or instructions, maintained in the instruction store 98, very quickly. In application, vertex data to be processed is transmitted into the general purpose register block 92 from multiplexer 66. The instruction store 98 then passes the corresponding control signals to the processor 96 on line 101 to perform such vertex operations. However, if the general purpose register block 92 does not have enough available space therein to store the incoming vertex data, such information will not be transmitted as the arbitration scheme of the arbiter 64 is not satisfied. In this manner, any pixel calculation operations that are to be, or are currently being, performed by the processor 96 are continued, based on the instructions maintained in the instruction store 98, until enough registers within the general purpose register block 92 become available. Thus, through the sharing of resources within the unified shader 62, processing of image data is enhanced as there is no down time associated with the processor 96.

Referring back to FIG. 4A, the graphics processor 60 further includes a cache block 70, including a parameter cache 70A and a position cache 70B which accepts the pixel based output of the unified shader 62 on line 85 and stores the respective pixel parameter and position information in the corresponding cache. The pixel information present in the cache block 70 is then transmitted to the primitive assembly block 72 on line 71. The primitive assembly block 72 is responsible for assembling the information transmitted thereto from the cache block 70 into a series of triangles, or other suitable primitives, for further processing. The assembled primitives are then transmitted on line 73 to rasterization engine block 74, where the transmitted primitives are then converted into individual pixel data information through a walking process, or any other suitable pixel generation process. The resulting pixel data from the rasterization engine block 74 is the interpolated pixel parameter data that is transmitted to the second input of the multiplexer 66 on line 75.

In those situations when vertex data is transmitted to the unified shader 62 through the multiplexer 66, the resulting vertex data generated by the processor 96, is transmitted to a render back end block 76 which converts the resulting vertex data into at least one of several formats suitable for later display on display device 84. For example, if a stained glass appearance effect is to be applied to an image, the information corresponding to such appearance effect is associated with the appropriate position data by the render back end 76. The information from the render back end 76 is then transmitted to memory 82 and a display controller line 80 via memory controller 78. Such appropriately formatted information is then transmitted on line 83 for presentation on display device 84.

Figure 4B:
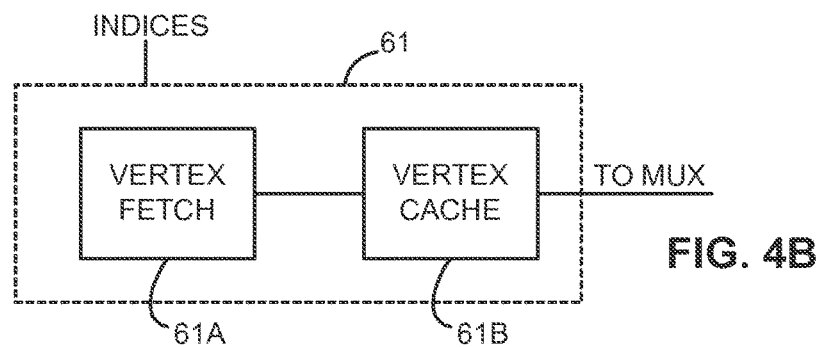
FIG. 4B is a schematic block diagram of an optional input component to the graphics processor according to an alternate embodiment of the present invention.

Referring now to FIG. 4B, shown therein is a vertex block 61 which is used to provide the vertex information at the first input of the multiplexer 66 according to an alternate embodiment of the present invention. The vertex block 61 includes a vertex fetch block 61A which is responsible for retrieving vertex information from memory 82, if requested, and transmitting that vertex information into the vertex cache 61B. The information stored in the vertex cache 61B comprises the vertex information that is coupled to the first input of multiplexer 66.

As discussed above, the graphics processor 60 of the present invention incorporates a unified shader 62 which is capable of performing both vertex manipulation operations and pixel manipulation operations based on the instructions stored in the instruction store 98. In this fashion, the graphics processor 60 of the present invention takes up less real estate than conventional graphics processors as separate vertex shaders and pixel shaders are no longer required. In addition, as the unified shader 62 is capable of alternating between performing vertex manipulation operations and pixel manipulation operations, graphics processing efficiency is enhanced as one type of data operations is not dependent upon another type of data operations. Therefore, any performance penalties experienced as a result of dependent operations in conventional graphics processors are overcome.

The above detailed description of the present invention and the examples described therein have been presented for the purposes of illustration and description. It is therefore contemplated that the present invention cover any and all modifications, variations and equivalents that fall within the spirit and scope of the basic underlying principles disclosed and claimed herein.

What is claimed is:

1. A graphics processor, comprising:
 a multiplexer configured to:
  receive, at a first input, vertex data, and
  receive, at a second input, interpolated pixel parameter and attribute data;
 an arbiter circuit, coupled to the multiplexer, configured to implement an arbitration scheme to determine which data received at the first input or the second input of the multiplexer is to be transmitted to a unified shader;
the unified shader, coupled to the arbiter circuit, configured to:
receive the vertex data or the interpolated pixel parameter and attribute data,
process the vertex data or the interpolated pixel parameter and attribute data, and
based on processing the vertex data or the interpolated pixel parameter and attribute data, generate an output representing an appearance attribute, wherein the appearance attribute is at least one of color, lighting, texture, normal, or position data, and
wherein the output includes a pixel parameter or a position information;
a cache block, coupled to the unified shader, configured to:
receive the output of the unified shader, and
store the respective pixel parameter and position information of the output in a corresponding cache;
a primitive assembly block, coupled to the cache block, configured to:
receive the output stored on the cache block, and
assemble the output into primitives; and
a rasterization block, coupled to the primitive block, configured to:
convert the primitives into individual pixel data information representing the interpolated pixel parameter and attribute data received by the multiplexer at the second input of the multiplexer.

2. The graphics processor of claim 1, wherein the unified shader further comprises a processor unit configured to execute vertex operations and pixel operations.

3. The graphics processor of claim 2, wherein the unified shader further comprises a sequencer coupled to the processor unit, wherein the sequencer is operative to cause the processor unit to execute the vertex operations and the pixel operations on the vertex data and the interpolated pixel parameter and attribute data.

4. The graphics processor of claim 3, wherein the sequencer further comprises an instruction store configured to maintain vertex instructions and pixel instructions that when executed by the processor unit perform the vertex operations and the pixel operations.

5. The graphics processor of claim 4, wherein the processor unit is configured to execute the pixel operations that are to be or are currently being executed based at least on the instructions maintained in the instruction store until enough registers within a register block become available.

6. The graphics processor of claim 2, wherein the processor unit comprises:
a first section configured to perform arithmetic operations on at least a portion of the vertex data or the interpolated pixel parameter and attribute data, and
a second section configured to perform logical operations on at least a portion of the vertex data or the interpolated pixel parameter and attribute data.

7. The graphics processor of claim 2, wherein the processor unit is configured to:
execute the vertex operations and the pixel operations on at least a portion of the vertex data or the interpolated pixel parameter and attribute data; and
provide at least vertex position data based at least on an execution of a vertex operation.

8. The graphics processor of claim 1, wherein the unified shader further comprises a register block coupled to the arbiter circuit, wherein the register block is configured to maintain the vertex data and the interpolated pixel parameter and attribute data in the unified shader.

9. The graphics processor of claim 8, wherein the unified shader further comprises:
at least one source register coupled to the register block, wherein the at least one source register is configured to store at least one operand transferred from the register block, and
the at least one operand includes at least a portion of the vertex data or the interpolated pixel parameter and attribute data maintained in the register block.

10. The graphics processor of claim 9, wherein the sequencer is configured to:
cause the at least one operand to be transferred from the register block to the at least one source register, and
indicate to the processor unit of the unified shader to execute at least one operation on the at least one operand in the at least one source register.

11. The graphics processor of claim 10, wherein:
the processor unit is configured to execute the at least one operation on the at least one operand; and
the at least one operation includes an arithmetic operation and a logical operation.

12. The graphics processor of claim 1, wherein:
the arbiter circuit is further configured to:
generate a control signal indicating which data received at the first input or the second input of the multiplexer is to be transmitted to the unified shader; and
the multiplexer is further configured to:
select the vertex data or the interpolated pixel parameter and attribute data to be transmitted to the unified shader based on the control signal.

13. The graphics processor of claim 1, wherein the unified shader is configured to simultaneously perform vertex operations and pixel operations on the vertex data and the interpolated pixel parameter and attribute data by switching between the vertex operations and the pixel operations.

14. The graphics processor of claim 1, further comprising a vertex fetch block, coupled to the multiplexer, configured to retrieve vertex data from a memory and transmit the vertex data to the first input of the multiplexer.

15. The graphics processor of claim 14, wherein the vertex fetch block comprises a vertex cache to store the retrieved vertex data.

16. A method of operating a graphics processor comprising:
receiving, at a first input of a multiplexer, vertex data;
receiving, at a second input of the multiplexer, interpolated pixel parameter and attribute data;
performing, by an arbiter circuit coupled to the multiplexer, an arbitration scheme to determine which data received at the first input or the second input of the multiplexer is to be transmitted to a unified shader;
receiving, at the unified shader coupled to the arbiter circuit, the vertex data or the interpolated pixel parameter and attribute data;
processing, by the unified shader, the vertex data or the interpolated pixel parameter and attribute data;
based on processing the vertex data or the interpolated pixel parameter and attribute data, generating by the unified shader, an output representing an appearance attribute, wherein the appearance attribute is at least one of color, lighting, texture, normal, or position data, and wherein the output includes a pixel parameter or a position information;
receiving, at a cache block coupled to the unified shader, the output of the unified shader;

storing, at the cache block, the respective pixel parameter and position information of the output in a corresponding cache;

receiving, at a primitive assembly block coupled to the cache block, the output stored on the cache block;

assembling, by the primitive assembly block, the output into primitives; and converting, by a rasterization block coupled to the primitive block, the primitives into individual pixel data information representing the interpolated pixel parameter and attribute data received by the multiplexer at the second input of the multiplexer.

17. The method of claim 16, further comprising executing, by a processor unit of the unified shader, vertex operations and pixel operations.

18. The method of claim 16, further comprising maintaining, by a register block coupled to the arbiter circuit, the vertex data and the interpolated pixel parameter and attribute data.

19. The method of claim 16, further comprising causing, by a sequencer coupled to the processor unit, the processor unit to execute vertex operations and pixel operations on the vertex data and the interpolated pixel parameter and attribute data.

20. The method of claim 16, further comprising executing, by the processing unit, pixel operations that are to be or are currently being executed based at least on instructions maintained in an instruction store configured to maintain vertex instructions and pixel instructions that when executed by the processor unit perform vertex operations and pixel operations, until enough registers within a register block become available.

* * * * *

UNITED STATES PATENT AND TRADEMARK OFFICE
CERTIFICATE OF CORRECTION

PATENT NO. : 11,605,149 B2
APPLICATION NO. : 17/708500
DATED : March 14, 2023
INVENTOR(S) : Morein et al.

Page 1 of 1

It is certified that error appears in the above-identified patent and that said Letters Patent is hereby corrected as shown below:

In the Claims

In Column 7, Claim 1, Lines 14-15, delete "wherein the output includes a pixel parameter or a position information;" and insert the same at "Line 13" after "and" as a continuation point.

Signed and Sealed this
Second Day of May, 2023

*Katherine Kelly Vidal*

Katherine Kelly Vidal
*Director of the United States Patent and Trademark Office*